(12) United States Patent
Nishimura

(10) Patent No.: US 12,103,809 B2
(45) Date of Patent: Oct. 1, 2024

(54) IMAGE READING APPARATUS

(71) Applicant: SEIKO EPSON CORPORATION, Tokyo (JP)

(72) Inventor: Yoichiro Nishimura, Kitakyushu (JP)

(73) Assignee: Seiko Epson Corporation, Tokyo (JP)

( * ) Notice: Subject to any disclaimer, the term of this patent is extended or adjusted under 35 U.S.C. 154(b) by 183 days.

(21) Appl. No.: 17/936,574

(22) Filed: Sep. 29, 2022

(65) Prior Publication Data

US 2023/0094561 A1 Mar. 30, 2023

(30) Foreign Application Priority Data

Sep. 30, 2021 (JP) .................................. 2021-160548

(51) Int. Cl.
  B65H 5/06 (2006.01)
  B65H 29/12 (2006.01)
  H04N 1/12 (2006.01)

(52) U.S. Cl.
  CPC .......... B65H 5/062 (2013.01); B65H 29/125 (2013.01); H04N 1/1225 (2013.01); *B65H 2404/144* (2013.01); *B65H 2404/1451* (2013.01); *B65H 2515/30* (2013.01)

(58) Field of Classification Search
  CPC ........ B65H 5/06; B65H 5/062; B65H 29/125; B65H 2404/144; B65H 2404/1441; B65H 2404/1442; B65H 2404/1451; B65H 2511/13; B65H 2515/30; B65H 2515/34; H04N 1/1225
  See application file for complete search history.

(56) References Cited

U.S. PATENT DOCUMENTS

| | | | |
|---|---|---|---|
| 2008/0006995 A1* | 1/2008 | Nonaka | G03G 15/6529 271/265.01 |
| 2008/0157465 A1* | 7/2008 | Matsumoto | B65H 5/062 271/277 |
| 2010/0309531 A1* | 12/2010 | Robinson | B07C 5/342 358/474 |
| 2019/0100394 A1* | 4/2019 | Anami | B65H 5/062 |
| 2019/0291988 A1 | 9/2019 | Hayashi | |
| 2020/0165088 A1* | 5/2020 | Maeyama | G03G 15/5062 |

FOREIGN PATENT DOCUMENTS

| | | |
|---|---|---|
| JP | 2001-048374 A | 2/2001 |
| JP | 2019-165356 A | 9/2019 |

* cited by examiner

*Primary Examiner* — Prasad V Gokhale
(74) *Attorney, Agent, or Firm* — WORKMAN NYDEGGER

(57) ABSTRACT

A scanner includes: a first transport roller pair that transports a material; a reader that reads the material; a second transport roller pair that transports the material; a transport motor; and a pressing section. The transport motor 50 rotates both the rollers of the first transport roller pair and both the rollers of the second transport roller pair. The pressing section can vary a first pressing force generated in the first transport roller pair and a second pressing force generated in the second transport roller pair. The pressing section varies the second pressing force in such a way that the second pressing force when the first transport roller pair transports the material but the second transport roller pair does not transport the material becomes lower than the second pressing force when neither the first transport roller pair nor the second transport roller pair transports the material.

11 Claims, 16 Drawing Sheets

IMAGE READING APPARATUS

The present application is based on, and claims priority from JP Application Serial Number 2021-160548, filed Sep. 30, 2021, the disclosure of which is hereby incorporated by reference herein in its entirety.

BACKGROUND

1. Technical Field

The present disclosure relates to image reading apparatuses.

2. Related Art

JP-A-2019-165356 discloses an image reading apparatus that includes first and second feed rollers and first and second pressure rollers. These rollers are driven by a single motor and receive elastic forces from the respective pressure-applying springs.

When an image reading apparatus as described above reads a thick material such as a booklet with its reader, the material is transported to the site opposite the reader by a first roller pair that is positioned upstream of the reader in the transport direction. After the material has been read, the material is transported to a second roller pair positioned downstream of the reader. When the downstream edge of the material in the transport direction enters the nip between the rollers of the second roller pair, these rollers are moved away from one another by the material. The entry of the material in the nip of the second roller pair generates a load on the first roller pair, which may cause the slowdown of the rotation of the first roller pair, thereby lowering the quality in which the reader reads the material.

SUMMARY

The present disclosure is an image reading apparatus, which includes: a first transport roller pair that simultaneously presses and transports a material, the first transport roller pair having a first roller and a second roller; a reader that reads the material being transported by the first transport roller pair; a second transport roller pair that simultaneously presses and transports the material, the second transport roller pair having a third roller and a fourth roller, the second transport roller pair being positioned downstream of the reader in a transport direction of the material; a driver that applies power to the first roller, the second roller, the third roller, and the fourth roller; and a pressing section configured to vary a first pressing force and a second pressing force, the first pressing force being generated between the first roller and the second roller, the second pressing force being generated between the third roller and the fourth roller. The pressing section varies the second pressing force in such a way that the second pressing force when the first transport roller pair transports the material but the second transport roller pair does not transport the material becomes lower than the second pressing force when neither the first transport roller pair nor the second transport roller pair transports the material.

DESCRIPTION OF EXEMPLARY EMBODIMENTS

Figure 1:
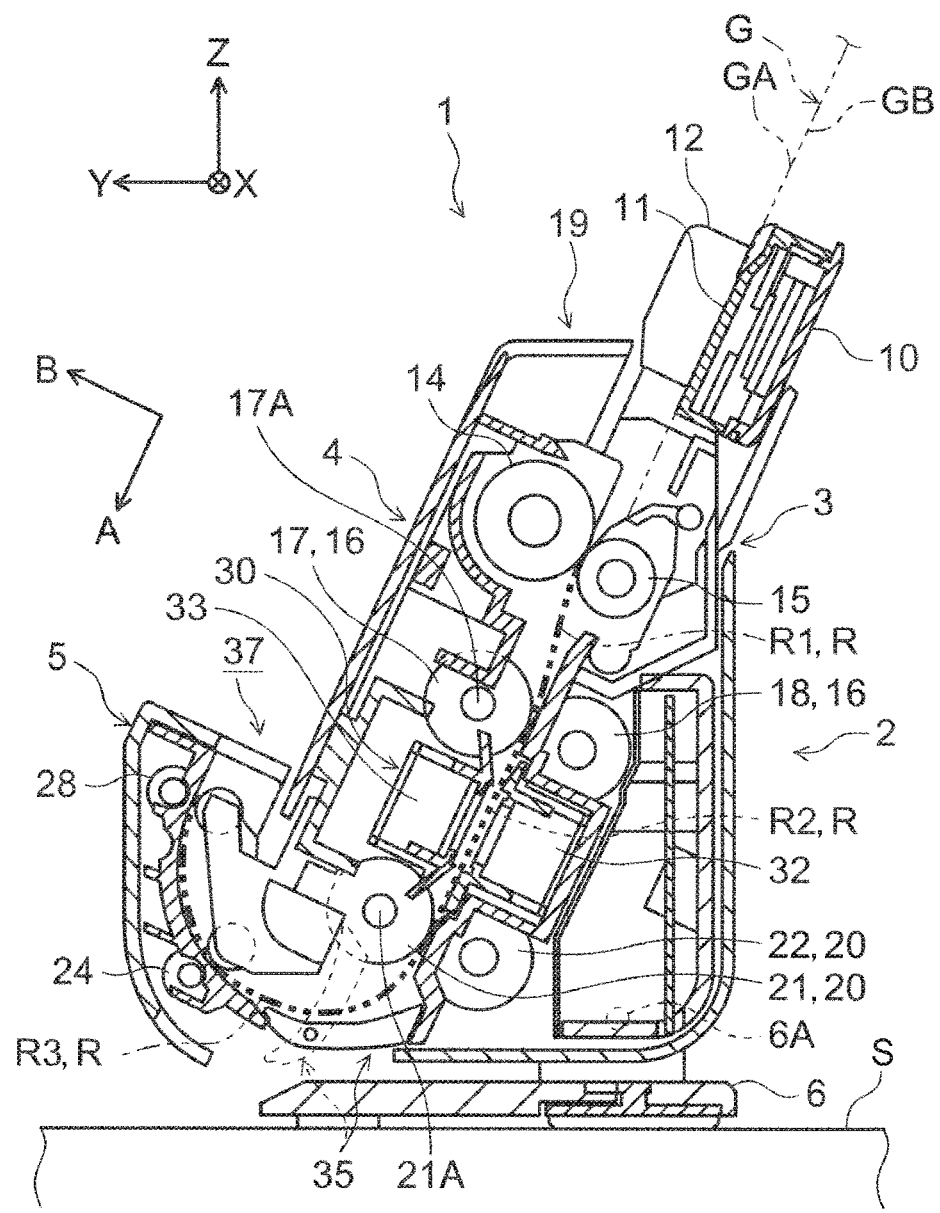
FIG. 1 is a cross-sectional, side view of a scanner according to an embodiment of the present disclosure with its main body being in a regular reading posture.

The outline of the present disclosure will be described below. According to a first aspect of the present disclosure, an image reading apparatus includes: a first transport roller pair that simultaneously presses and transports a material, the first transport roller pair having a first roller and a second roller; a reader that reads the material being transported by the first transport roller pair; a second transport roller pair that simultaneously presses and transports the material, the second transport roller pair having a third roller and a fourth roller, the second transport roller pair being positioned downstream of the reader in a transport direction of the material; a driver that applies power to the first roller, the second roller, the third roller, and the fourth roller; and a pressing section configured to vary a first pressing force and a second pressing force, the first pressing force being generated between the first roller and the second roller, the second pressing force being generated between the third roller and the fourth roller. The pressing section varies the second pressing force in such a way that the second pressing force when the first transport roller pair transports the material but the second transport roller pair does not transport the material becomes lower than the second pressing force when neither the first transport roller pair nor the second transport roller pair transports the material.

In the first aspect, when the reader reads a thick material such as a booklet, the material is transported in the transport direction by the first transport roller pair and passes through the nip between the first roller and the second roller while receiving the first pressing force from the first roller and the second roller. Then, the material reaches the site opposite the reader and is read by the reader, after which the material is transported to the second transport roller pair. In this case, the pressing section varies the second pressing force in such a way that the second pressing force when the first transport roller pair transports the material but the second transport roller pair does not transport the material becomes lower than the second pressing force when neither the first transport roller pair nor the second transport roller pair transports the material. When the downstream edge of the read material in the transport direction enters the nip between the third roller and the fourth roller, the third roller and the fourth roller are moved away from one another by the material. In this case, by reducing the second pressing force, a load placed on the first transport roller pair is lightened. As a result, the first transport roller pair can keep transporting the material at a constant speed. This configuration thus suppresses the speed at which the first transport roller pair transports the material from being decreased, thereby successfully reducing the risk of a lowered quality in which the reader reads the material.

According to a second aspect of the present disclosure, the image reading apparatus may have, in addition to the configuration of the first aspect, the following configuration:

the pressing section varies the first pressing force in such a way that the first pressing force when the first transport roller pair transports the material but the second transport roller pair does not transport the material becomes greater than the first pressing force when both the first transport roller pair and the second transport roller pair transport the material; and the pressing section varies the second pressing force in such a way that the second pressing force when the second transport roller pair transports the material but the first transport roller pair does not transport the material becomes greater than the second pressing force when both the first transport roller pair and the second transport roller pair transport the material.

The configuration of the second aspect increases a pressing force applied to the material when only one of the first transport roller pair and the second transport roller pair transports the material. This configuration suppresses the material from slipping on the first transport roller pair or the second transport roller pair, thereby successfully transporting the material stably.

According to a third aspect of the present disclosure, the image reading apparatus may have, in addition to the configuration of the first or second aspect, a configuration in which the pressing section varies the first pressing force and the second pressing force so as to become equal to one another when both the first transport roller pair and the second transport roller pair transport the material.

The configuration of the third aspect produces substantially the same effect as in the first or second aspect.

According to a fourth aspect of the present disclosure, the image reading apparatus may have, in addition to the configuration of one of the first to third aspects, a configuration in which the pressing section includes: a first pressing section configured to vary the first pressing force by varying a force applied to a first rotation axis of the first roller; a second pressing section configured to vary the second pressing force by varying a force applied to a second rotation axis of the third roller; and an interlocking section that interlocks a first operation in which the first pressing section varies the first pressing force and a second operation in which the second pressing section varies the second pressing force.

In the fourth aspect, both of the first operation and the second operation are interlocked to vary the first pressing force and the second pressing force. This configuration can be implemented in a simple manner, as opposed to a configuration in which the mechanisms for varying the first pressing force and the second pressing force are driven independently of one another. The "vary" used in the fourth aspect may imply "decrease" the second pressing force in the first aspect as well as "increase" the second pressing force.

According to a fifth aspect of the present disclosure, the image reading apparatus may have, in addition to the configuration of the fourth aspect, the following configuration: the interlocking section is a shaft member rotatably provided; one of the first pressing section and the second pressing section is fixed to the shaft member; and a gap by which a timing at which the first operation starts is shifted from a timing at which the second operation starts is provided between the shaft member and the other of the first pressing section and the second pressing section.

If the first pressing section is integrated with the second pressing section, when the first pressing section is somewhat displaced, the second pressing section may also be displaced simultaneously. Likewise, when the second pressing section is somewhat displaced, the first pressing section may also be displaced simultaneously. In shirt, the configuration in which the first pressing section is integrated with the second pressing section is prone to fluctuate the pressing forces of the first pressing section and the second pressing section. In the fifth aspect, however, forming the gap allows the start timings of the first operation and the second operation to be shifted from one another, although the first operation and the second operation are interlocked together. As a result, even when one of the first pressing section and the second pressing section is somewhat displaced, the other is not largely displaced simultaneously. This configuration thus successfully suppresses the first pressing force and the second pressing force from fluctuating.

According to a sixth aspect of the present disclosure, the image reading apparatus may have, in addition to the configuration of the fourth or fifth aspect, a configuration in which the first pressing section presses a center of the first rotation axis in an axial direction of the first rotation axis and in which the second pressing section presses a center of the second rotation axis in the axial direction.

In the sixth aspect, the pressed portions of the first rotation axis and the second rotation axis are aligned with the center in the axial direction. This configuration thus enables a load to be placed evenly on each of the first rotation axis and the second rotation axis in the axial direction.

According to a seventh aspect of the present disclosure, the image reading apparatus may further include, in addition to the configuration of one of the first to sixth aspects, a feed roller that feeds the material to the first transport roller pair, the feed roller being provided upstream of the first transport roller pair in the transport direction, and a correcting member that comes into contact with the material, the correcting member being provided between the feed roller and the first transport roller pair. The correcting member may come into contact with a center of the material being fed by the feed roller in a width direction of the material, the width direction intersecting the transport direction.

In the seventh aspect, the correcting member comes into contact with the center of the material in the width direction, thereby suppressing the center of the material in the width direction from floating off the transport route. This configuration thus successfully suppresses a failure to feed the material to the first transport roller pair due to wrinkling or jamming of the material.

According to an eighth aspect of the present disclosure, the image reading apparatus may have, in addition to the configuration of the seventh aspect, a configuration in which the correcting member guides the material to a nip between the first roller and the second roller.

In the eighth aspect, when coming into contact with the material being transported, the correcting member guides the material to the nip between the first roller and the second roller. This configuration thus reliably transports the material to the nip between the first roller and the second roller, as opposed to a configuration without such a correcting member.

According to a ninth aspect of the present disclosure, the image reading apparatus may have, in addition to the configuration of the seventh or eighth aspect, a configuration in which the correcting member is provided pivotably toward a first rotation axis of the first roller.

In the ninth aspect, when a thin material is fed to the first transport roller pair, the correcting member comes into contact with the material, thereby successfully suppressing the material from partly floating off the transport route. In this case, the correcting member does not largely pivot because only a small reactive force is applied by the material to the correcting member. When a thick material is transported to the first transport roller pair, a great reactive force is applied by the material to the correcting member. As a result, the correcting member largely pivots toward the first rotation axis, namely, moves far away from the transport route of the material. This configuration thus suppresses an increase in the reactive force applied by the correcting member to a material being transported, thereby successfully reducing the load placed on the feed roller during feeding of a thick material.

Figure 2:
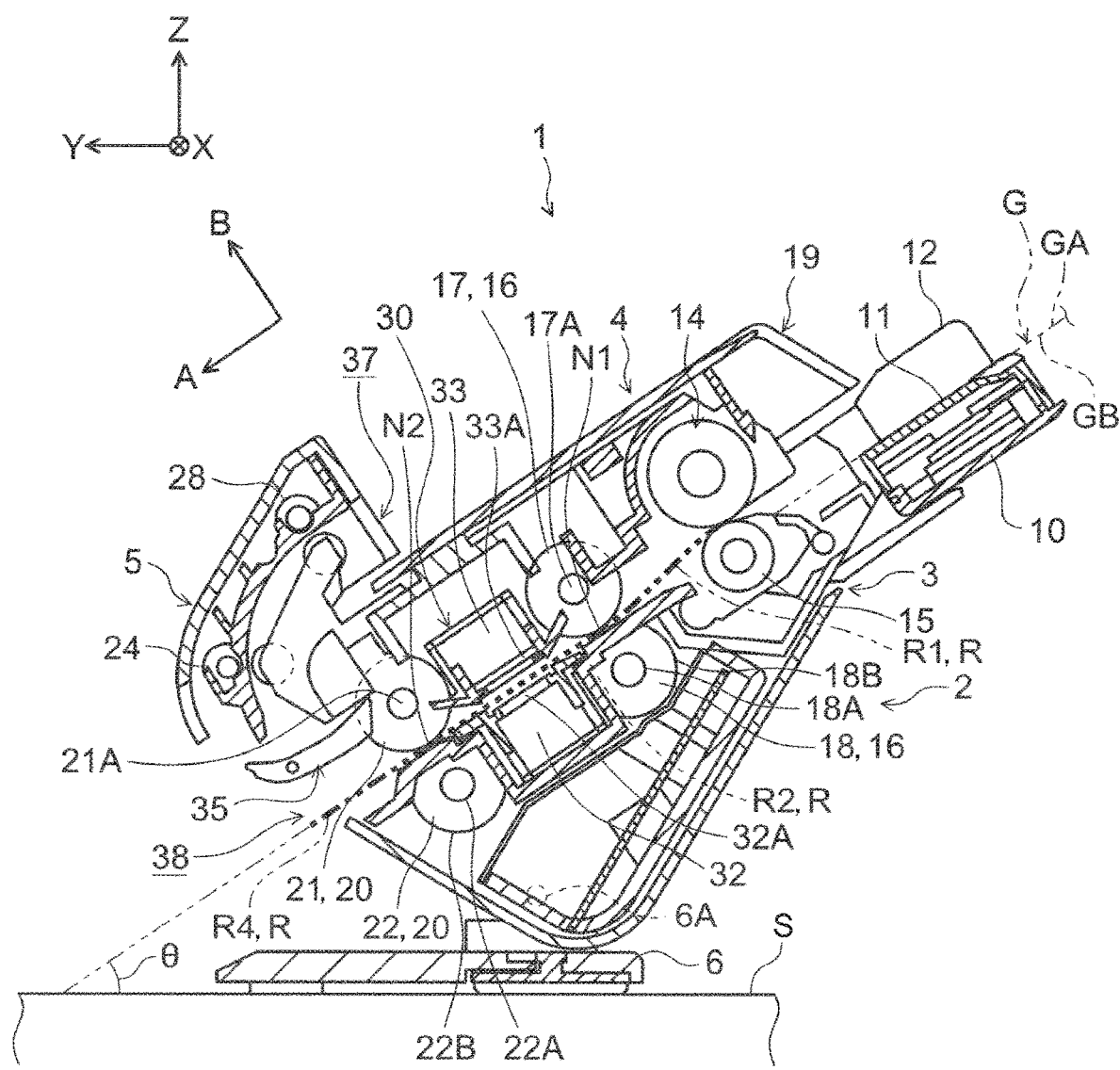
FIG. 2 is a cross-sectional, side view of the scanner with the main body being in a booklet reading posture.

Some embodiments of the present disclosure will be described below. With reference to FIGS. 1 and 2, a scanner 1, which is an example of an image reading apparatus, will be described below. The scanner 1 can read at least one of a first surface GA and a second surface GB of a material G. The scanner 1 may be a feed-type scanner in which a reader 30 reads the material G moving relative to the reader 30 (described later). Herein, the material G may be in the form of a sheet, a card, or a booklet.

The individual drawings employ an X-Y-Z coordinate system, in which the X-axis extends in a width direction of the scanner 1 and the material G, the Y-axis extends in a depth direction of the scanner 1, and the Z-axis extends in a vertical direction. In this embodiment, the direction from the rear to the front of the scanner 1 is defined as the +Y direction, whereas the direction from the front to the rear of the scanner 1 is defined as the −Y direction. Likewise, the direction from the right to the left of the scanner 1 as viewed from the front is defined as the +X direction, whereas the direction from the left to the right of the scanner 1 as viewed from the front is defined as the −X direction. The upward direction is defined as the +Z direction, whereas the downward direction is defined as the −Z direction.

Hereinafter, the axis along which a transport route R of the material G is formed at a site opposite the reader 30 is defined as the A-axis. The direction in which the material G is transported along the A-axis is defined as the +A direction, which is an example of a transport direction of the material G. The A-axis is orthogonal to the X-axis and extends in both the +Y and −Z directions. The axis orthogonal to both the A- and X-axes is defined as the B axis. Of the directions along the B axis, one having the +Z-directional component is defined as the +B direction, and one having the −Z-directional component is defined as the −B direction.

The scanner 1 includes: a main body 2; and a stand 6 that rotatably supports the main body 2. The main body 2 accommodates the transport route R (described later) along which the material G is to be transported and includes a first unit 3, a second unit 4, and a third unit 5.

The first unit 3 includes an upper opening/closing section 10, a separation roller 15, a second roller 18, a fourth roller 22, a controller 34 (see FIG. 3), a posture switching motor 40 (see FIG. 3), and a transport motor 50 (see FIG. 3), details of which will be described later. The second unit 4 is positioned on the +Y-side of the first unit 3; the third unit 5 is positioned on the +Y-side of the second unit 4.

Each of the second unit 4 and the third unit 5 is rotatably provided about a frame rotation shaft (not illustrated) having a rotation axis substantially parallel to the X-axis. Both of the second unit 4 and the third unit 5 are integrally rotatable around the frame rotation axis relative to the first unit 3. By rotating both the second unit 4 and the third unit 5 relative to the first unit 3, a material supply route R1 and a reading transport route R2 (described later) can be exposed to the outside.

The third unit 5 is rotatable around a frame rotation axis (not illustrated) relative to both the first unit 3 and the second unit 4. By rotating the third unit 5 relative to the first unit 3 and the second unit 4, an inversion transport route R3 (described later) can be exposed to the outside.

The main body 2 is pivotable around a main body shaft 6A relative to the stand 6. In this embodiment, the main body 2 can be maintained in two postures by rotating it. In FIG. 1, the main body 2 is in a regular reading posture; in FIG. 2, the main body 2 is in a booklet reading posture. The postures of the main body 2 can be switched by driving the posture switching motor 40 (see FIG. 3) to rotate a gear meshing with a rack (not illustrated) in the stand 6. The driving of the posture switching motor 40 is controlled by the controller 34 (see FIG. 3). The plane on which the stand 6 is installed is defined as an installation surface S, which may be substantially parallel to the X-Y plane.

In FIG. 2, the angle between the reading transport route R2 (described later) and the installation surface S is defined as a posture angle θ (deg). The posture angle θ when the scanner 1 is in the booklet reading posture (see FIG. 2) is smaller than the posture angle θ when the scanner 1 is in the regular reading posture (see FIG. 1). When the scanner 1 is in the regular reading posture, the projected area of the main body 2 on the installation surface S becomes smaller, namely, the footprint of the main body 2 becomes smaller. Herein, the footprint may correspond to an area on the X-Y plane occupied by the main body 2 as viewed from the +Z-side.

The main body 2 has a front panel with an operative section (not illustrated) including a power button. In addition, the main body 2 has, on the +X-side, a connection section (not illustrated), which includes: a power plug through which electricity is supplied from an external power source to the main body 2; and a connector through which information, data, and signals are supplied to or output from the main body 2.

Next, a configuration of the transport route R of the material G in the scanner 1 will be described below. The first unit 3 includes the upper opening/closing section 10, which acts as an upper cover for the transport route R. The upper opening/closing section 10 rotates around a shaft (not illustrated), thereby covering or exposing a supply port 19. The upper opening/closing section 10 includes a material support 11 by which a material G to be supplied is supported in an inclined posture. When a plurality of materials G is supported by the material support 11, a feed roller 14 feeds only the uppermost one to the downstream section in the +A direction. The material support 11 has a pair of edge guides 12 that guides the ±X-edges of the material G. The edge guides 12 are arranged with some spacing therebetween and each slidable in the ±X directions. In this embodiment, the scanner 1 may employ a center feeding system to feed the material G.

The second unit 4 includes the feed roller 14, which is provided upstream of a first transport roller pair 16 (described later) in the +A direction. The feed roller 14 rotates by receiving the power from the transport motor 50 (see FIG. 3), thereby feeding the material G to the first transport roller pair 16. The first unit 3 includes the separation roller 15 provided so as to face the feed roller 14. The separation roller 15 receives a rotation torque from a torque limiter (not illustrated) and suppresses a plurality of materials G from being fed together. Both of the feed roller 14 and the separation roller 15 may be provided in substantially the center of the main body 2 in the +X direction. It should be noted that the separation roller 15 may be replaced with a separation pad. In this embodiment, the feed roller 14 is provided above the materials G when a plurality of materials G is mounted on the material support 11 and sequentially feeds the materials G from the uppermost one. Alternatively, the feed roller 14 may be provided below the materials G when a plurality of materials G is mounted on the material support 11 and may sequentially feed the materials G from the lowermost one.

The first transport roller pair 16, which transports the material G, is provided downstream of both the feed roller 14 and the separation roller 15 in the +A direction. The first transport roller pair 16 includes: a first roller 17 provided in the second unit 4; and a second roller 18 provided in the first unit 3. The first transport roller pair 16 presses the material G while rotating, thereby transporting the material G in the +A direction. The first roller 17 is provided so as to be movable toward or away from the second roller 18 in the ±B directions and kept pressed against the second roller 18 by a first pressing member 42 (see FIG. 5) that will be described later.

Figure 5:
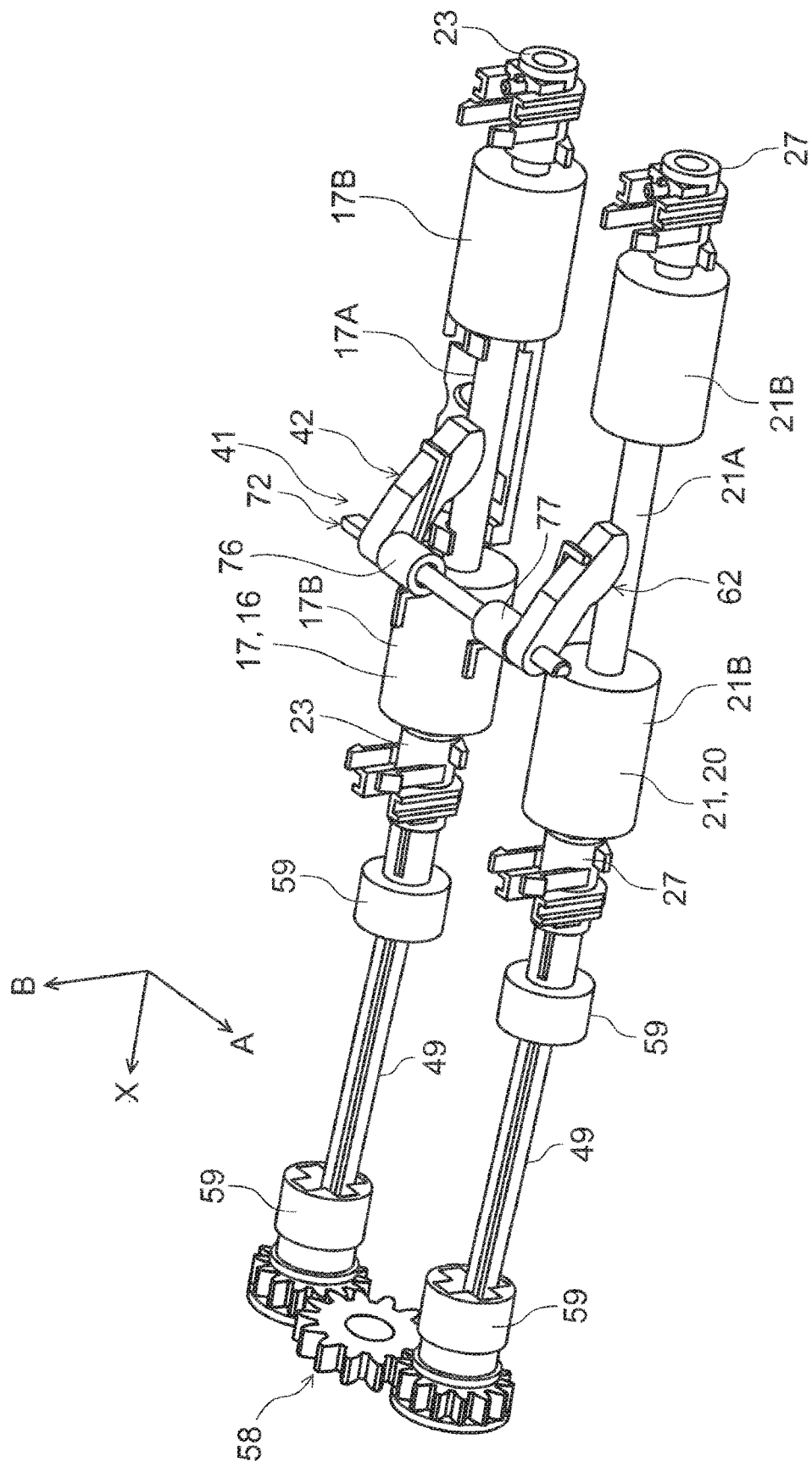
FIG. 5 is a perspective view of a configuration in which the driving force and a pressing force are applied to the first roller and the third roller.

As illustrated in FIG. 5, the first roller 17 includes: a shaft section 17A having a rod shape, which is an example of a first rotation axis; and a pair of roller sections 17B provided on the shaft section 17A. The roller sections 17B are positioned at the ±X-ends of the shaft section 17A, which are rotatably supported by respective bearing members 23.

Figure 16:
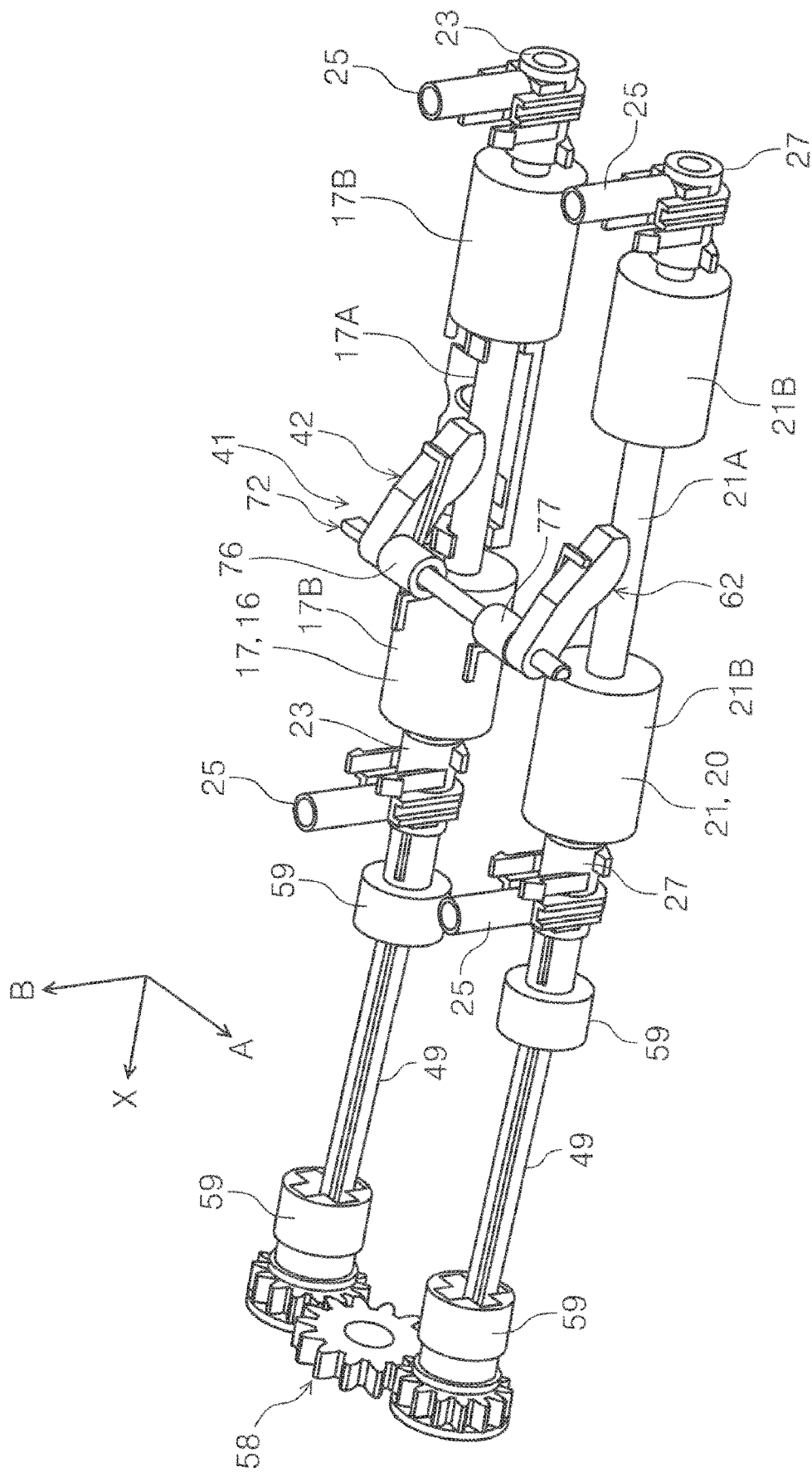
FIG. 16 is a perspective view of a configuration according to another embodiment in which the driving force and the pressing force are applied to the first roller and the third roller.

Each bearing member 23 is provided on a frame (not illustrated) in the second unit 4 (see FIG. 1) so as to be movable in the ±B directions. Thus, the bearing members 23 guide the movement of the shaft section 17A in the ±B directions but prohibit the movement of the shaft section 17A in the ±X and ±Y directions. The shaft section 17A is coupled at its +X-end to a corresponding universal joint 59. Optionally, the bearing members 23 are pressed in the −B direction by one or more pressing members such as coil springs. FIG. 16 illustrates this modification, in which reference numeral 25 denotes coil springs. In the modification, two bearing members 23 are in contact with the respective coil springs 25, which apply pressing forces to the bearing members 23 in the −B direction.

As illustrated in FIG. 2, the second roller 18 includes: a shaft section 18A having a rod shape; and a pair of roller sections 18B provided on the shaft section 18A. The roller sections 18B are positioned at the ±X-ends of the shaft section 18A.

Each of the first roller 17 and the second roller 18 rotates by receiving the power from the transport motor 50 (described later). When the second unit 4 is attached to the first unit 3, the first roller 17 comes into contact with the second roller 18, thereby forming a first nip N1. When the second unit 4 is detached from the first unit 3, the first roller 17 breaks the contact with the second roller 18.

The reader 30 that reads an image of a material G is provided downstream of the first transport roller pair 16 in the +A direction. The reader 30 includes a first reader 32 and a second reader 33 that face one another in the +B direction. In this embodiment, each of the first reader 32 and the second reader 33 may be a contact image sensor module (CISM). The reader 30 reads the material G being transported by the first transport roller pair 16.

The first reader 32 having a contact glass section 32A is provided in the first unit 3 and reads the second surface GB of the material G supported by the material support 11. The second reader 33 having a contact glass section 33A is provided in the second unit 4 and reads the first surface GA of the material G supported by the material support 11. The second reader 33 is provided so as to be movable in the ±B directions. Furthermore, a second transport roller pair 20 is provided downstream of the reader 30 in the +A direction.

The second transport roller pair 20 includes: a third roller 21 provided in the second unit 4; and a fourth roller 22 provided in the first unit 3. The second transport roller pair 20 presses the material G while rotating, thereby transporting the material G in the +A direction. The third roller 21 is provided so as to be movable toward or away from the fourth roller 22 in the ±B directions and kept pressed against the fourth roller 22 by a second pressing member 62 (see FIG. 5) that will be described later.

As illustrated in FIG. 5, the third roller 21 includes: a shaft section 21A having a rod shape, which is an example of a second rotation axis; and a pair of roller sections 21B provided on the shaft section 21A. The roller sections 21B are positioned at the ±X-ends of the shaft section 21A. The shaft section 21A is supported at its the ±X-ends is rotatably supported by respective bearing members 27.

The configuration of the bearing members 27 may be substantially the same as that of the bearing members 23. More specifically, each bearing member 27 is provided on a frame (not illustrated) in the second unit 4 (see FIG. 1) so as to be movable in the ±B directions. Thus, the bearing members 27 guide the movement of the shaft section 21A in the ±B directions but prohibit the movement of the shaft section 21A in the ±X and ±Y directions. The shaft section 21A is coupled at the +X-end to a corresponding universal joint 59. Optionally, the bearing members 27 are pressed in the −B direction by one or more optional pressing members such as coil springs. FIG. 16 illustrates this modification, in which reference numeral 25 denotes the coil springs. In the modification, two bearing members 27 are in contact with the respective coil springs 25, which apply pressing forces to the bearing members 27 in the −B direction.

As illustrated in FIG. 2, the fourth roller 22 includes: a shaft section 22A having a rod shape; and a pair of roller sections 22B provided on the shaft section 22A. The roller sections 22B are positioned at the ±X-ends of the shaft section 22A.

Each of the third roller 21 and the fourth roller 22 rotates by receiving the power from the transport motor 50 (see FIG. 3) that will be described later. When the second unit 4 is attached to the first unit 3, the third roller 21 comes into contact with the fourth roller 22, thereby forming a second nip N2. When the second unit 4 is detached from the first unit 3, the third roller 21 breaks the contact with the fourth roller 22.

The transport route R in the main body 2 may include the material supply route R1, the reading transport route R2, the inversion transport route R3 (see FIG. 1), and a non-inversion transport route R4 (see FIG. 2). It should be noted that both of the inversion transport route R3 and the non-inversion transport route R4 do not simultaneously form the transport route R because the inversion transport route R3 and the non-inversion transport route R4 are selectively used.

The material supply route R1 extends from the nip between the feed roller 14 and the separation roller 15 to the first nip N1. The reading transport route R2 linearly extends from the first nip N1 to the second nip N2 through the site opposite the reader 30. When the main body 2 is in the regular reading posture, the inversion transport route R3 (see FIG. 1) is positioned downstream of the reading transport route R2. After having been read by the reader 30, the material G is inverted across the inversion transport route R3 and ejected obliquely upward to the outside via a first ejection port 37. A third transport roller pair 24 and a fourth transport roller pair 28 are provided on the inversion transport route R3.

When the main body 2 is in the booklet reading posture, the non-inversion transport route R4 (see FIG. 2) is positioned downstream of the reading transport route R2. After having been read by the reader 30, the material G is transported along the non-inversion transport route R4 without being inverted and ejected obliquely downward to the outside via a second ejection port 38. In this case, the second transport roller pair 20 acts as an ejection roller pair that ejects a material G to the outside through the non-inversion transport route R4.

The switching between the inversion transport route R3 (see FIG. 1) and the non-inversion transport route R4 (see FIG. 2) is made by a flap 35. The flap 35 is rotated by a solenoid (not illustrated) to allow the material G to be transported along one of the inversion transport route R3 and the non-inversion transport route R4 but prohibit the material G from being transported along the other. In this embodiment, the flap 35 may be rotated in response to the switching between the postures of the main body 2.

Figure 3:
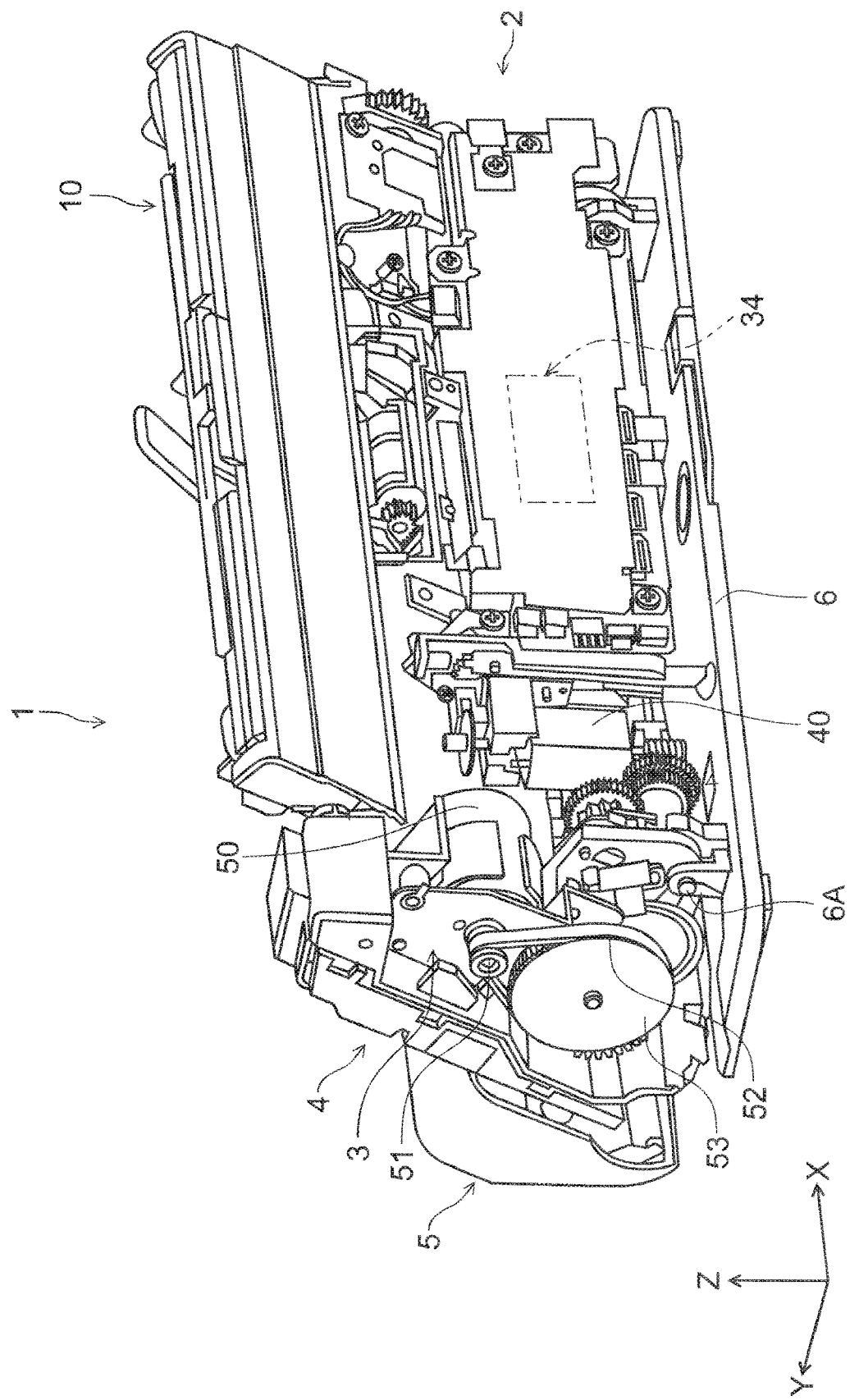
FIG. 3 is a rear perspective view of the scanner with the main body being in the regular reading posture.

With reference to FIG. 3, a control system of the scanner 1 will be described below. The controller 34 controls various operations of the scanner 1, including the feeding, transporting, ejecting, and reading of materials G. The controller 34 receives signals from the operative section (not illustrated) and controls the driving of the transport motor 50 and the posture switching motor 40 (described later). In this embodiment, each motor may be a direct current (DC) motor. The controller 34 also receives signals from various detectors, such as a mount detector, a multi-feeding detector, a material detector, and a posture detector.

Figure 4:
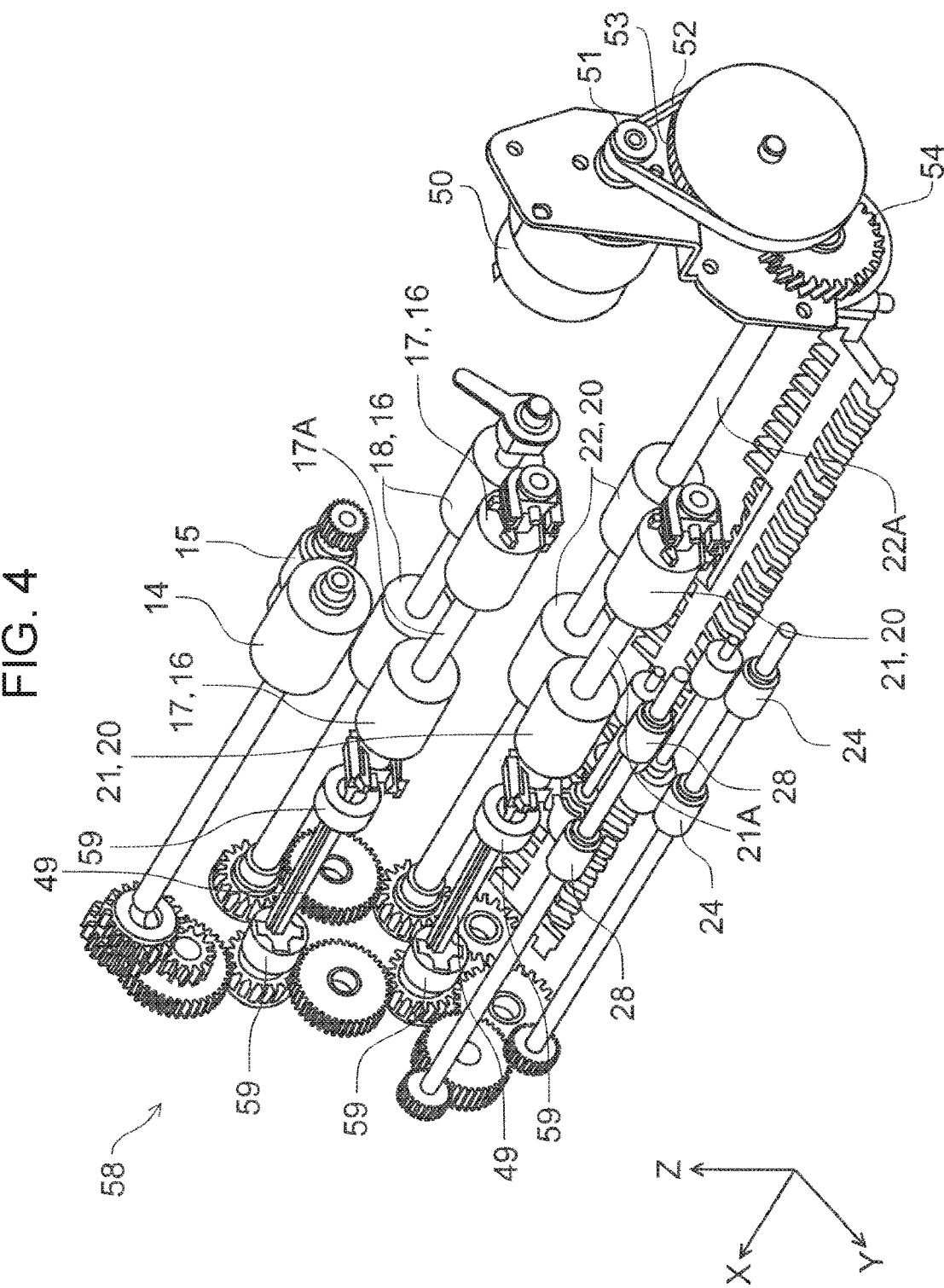
FIG. 4 is a perspective view of a configuration in which the driving force of the transport motor is transmitted to the individual rollers.

Next, with reference to FIG. 4, a description will be given below of a configuration in which the driving force of the transport motor 50 is transmitted to the individual rollers. The transport motor 50 is an example of a driver that rotates both the first transport roller pair 16 and the second transport roller pair 20. In addition, the transport motor 50 is provided near the −X-side of the main body 2 (see FIG. 1). The rotation shaft of the transport motor 50 is provided with a drive pulley 51, which transmits the driving force of the transport motor 50 to a driven pulley 53 via a belt 52. The driven pulley 53 is formed integrally with a gear (not illustrated), which meshes with a gear 54. The −X-end of the shaft section 22A of the fourth roller 22 is provided with a gear (not illustrated), which meshes with the gear 54 so that the shaft section 22A is driven.

The +X-end of the shaft section 22A is provided with a gear group 58, which rotates by receiving the power from the shaft section 22A, thereby transmitting the driving force to the shaft sections of the individual rollers. Although details of the gear group 58 will not be described, the driving force transmission routes of the first roller 17 and the third roller 21 are provided with the universal joints 59, unlike the driving force transmission route of other rollers. The universal joints 59 are provided at both ends of each of transfer shafts 49. With this configuration, the first roller 17 and the third roller 21 are driven by the transport motor 50 while the first roller 17 is displaced relative to the second roller 18 facing the first roller 17 and the third roller 21 is displaced relative to the fourth roller 22 facing the third roller 21.

Figure 14:
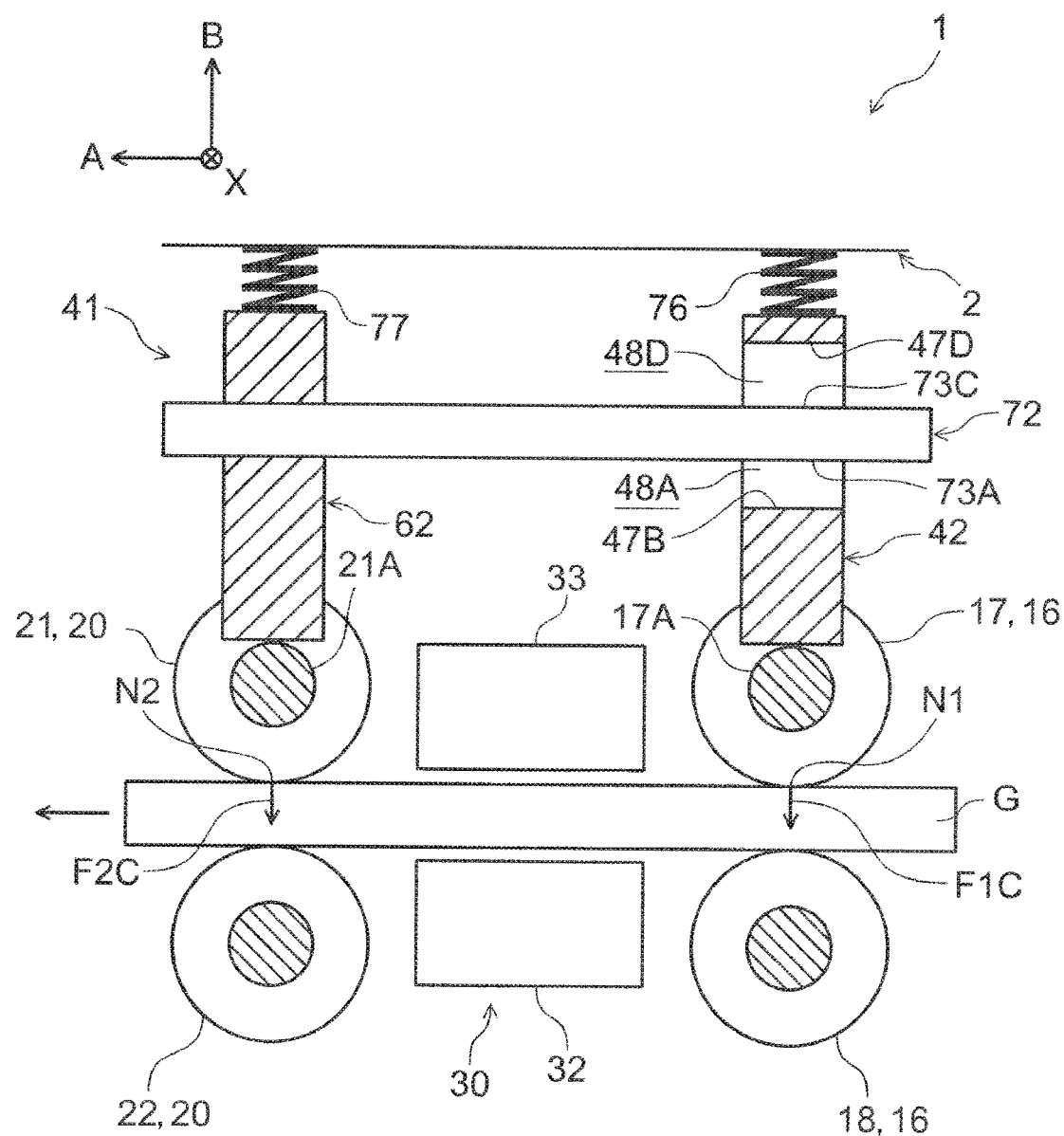
FIG. 14 is a partial, cross-sectional view of the scanner in which the material has already entered both the first nip and the second nip.

As illustrated in FIG. 14, the scanner 1 further includes a pressing section 41, which can vary a first pressing force applied to the material G in the first nip N1 and a second pressing force applied to the material G in the second nip N2. Further, the first pressing force is a pressing force generated between the first roller 17 and the second roller 18, whereas the second pressing force is a pressing force between the third roller 21 and the fourth roller 22.

Hereinafter, as appropriate, the first pressing force is denoted by F1A, F1B, F1C, or F1D, and the second pressing force is denoted by F2A, F2B, F2C, or F2D. In this case, the expression "two pressing forces are equal to one another" suggests that they are permitted to differ from one another as long as the difference falls within the range of a measurement error or within the range of a tolerance arising due to variations in the properties of components or due to fabrication errors.

The pressing section 41 varies a second pressing force F2 in such a way that a second pressing force F2B (see FIG. 13) when the first transport roller pair 16 transports the material G but the second transport roller pair 20 does not transports the material G becomes lower than a second pressing force F2A (see FIG. 12) when neither the first transport roller pair 16 nor the second transport roller pair 20 transports the material G. In short, the following relationship is satisfied: second pressing force F2B<second pressing force F2A.

The pressing section 41 varies a first pressing force F1 in such a way that a first pressing force F1B (see FIG. 13) when the first transport roller pair 16 transports the material G but the second transport roller pair 20 does not transport the material G becomes greater than a first pressing force F1C (see FIG. 14) when both the first transport roller pair 16 and the second transport roller pair 20 transport the material G. In short, the following relationship is satisfied: first pressing force F1B>first pressing force F1C.

The pressing section 41 varies the second pressing force F2 in such a way that a second pressing force F2D (see FIG. 15) when the second transport roller pair 20 transports the material G but the first transport roller pair 16 does not transport the material G becomes greater than a second pressing force F2C (see FIG. 14) when both when the first transport roller pair 16 and the second transport roller pair 20 transports material G. In short, the following relationship is satisfied: second pressing force F2D>second pressing force F2C.

The pressing section 41 varies the first pressing force F1C and the second pressing force F2C (see FIG. 14) so as to become equal to one another when both the first transport roller pair 16 and the second transport roller pair 20 transport the material G.

Figure 6:
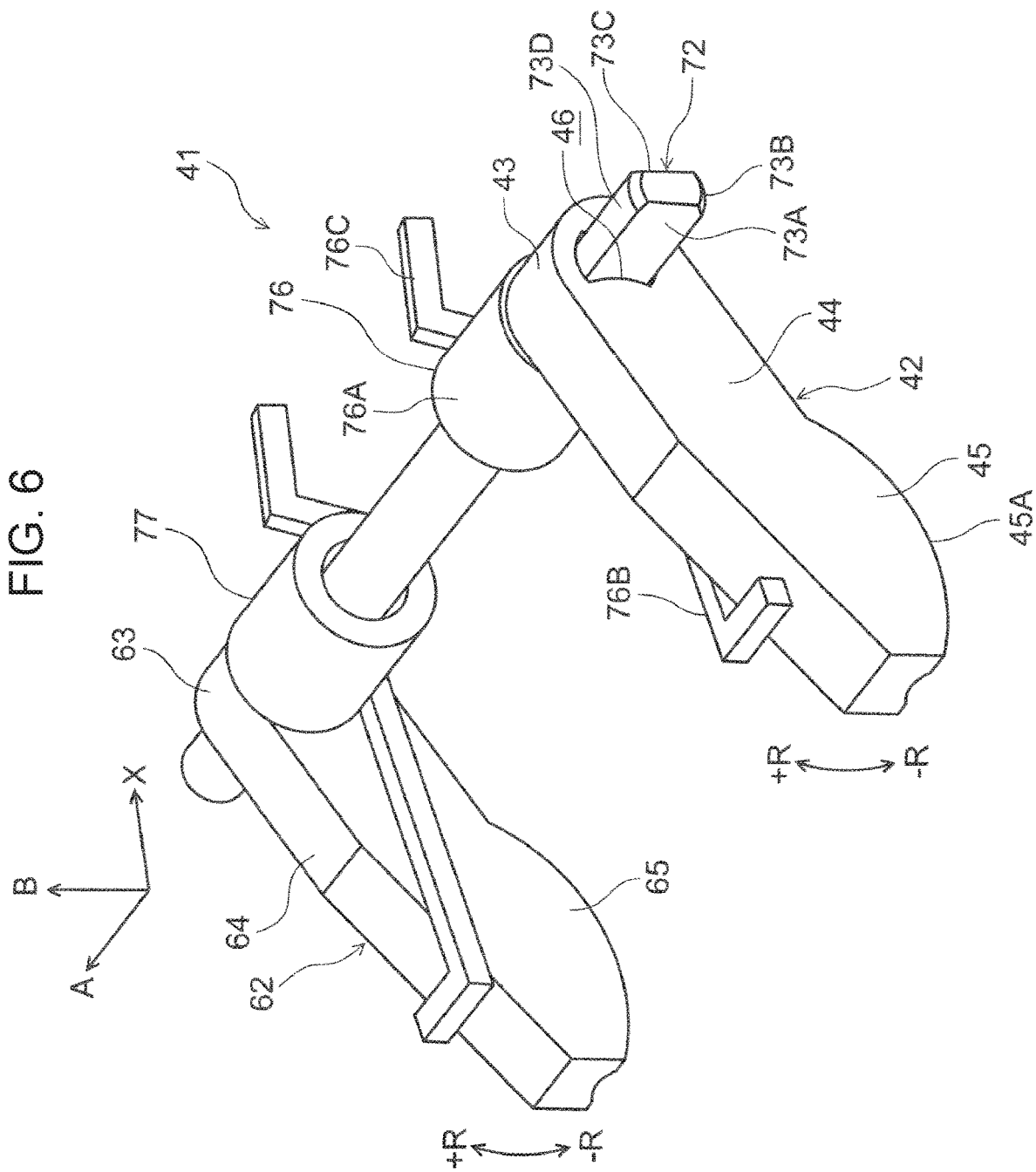
FIG. 6 is a perspective view of the pressing section.

As illustrated in the example of FIG. 6, the pressing section 41 includes a first pressing member 42, a second pressing member 62, a shaft member 72, a spring member 76, and a spring member 77. The first pressing member 42 is an example of a first pressing section configured to vary the first pressing force (see FIG. 14) by varying a force applied to the shaft section 17A of the first roller 17. The first pressing member 42 presses the center of the shaft section 17A in an axial direction of the shaft section 17A. The second pressing member 62 is an example of a second pressing section configured to vary the second pressing force (see FIG. 14) by varying a force applied to the shaft section 21A of the third roller 21. The second pressing member 62 presses the center of the shaft section 18A in the axial direction.

The shaft member 72 is an example of an interlocking section that interlocks a first operation in which the first pressing member 42 varies the first pressing force and a second operation in which the second pressing member 62 varies the second pressing force. The spring member 76 applies a pressing force to the first pressing member 42, whereas the spring member 77 applies a pressing force to the second pressing member 62. Hereinafter, a description will be given of functions of the first pressing member 42, the second pressing member 62, the shaft member 72, the spring member 76, and the spring member 77.

As illustrated in FIG. 6, the first pressing member 42, which is coupled to the −A-end of the shaft member 72, may be a lever member that extends from the shaft member 72 in a direction intersecting both the −X and −B directions. The first pressing member 42 includes a coupled section 43, an arm section 44, a curved section 45, and an insertion section 46 (described later). The outer shape of the coupled section 43 may be semicircular as viewed from the +A-side. The arm section 44 extends from the coupled section 43 in both the −X and −B directions. The curved section 45 is formed at the end of the arm section 44 opposite the coupled section 43 and on the −B-side surface of the arm section 44. In addition, the curved section 45 has a lower surface 45A in the form of a segment of a circle which bulges from the arm section 44 in the −B direction. The lower surface 45A comes into contact with a corresponding portion of the outer circumferential surface of the shaft section 17A (see FIG. 5) from the −B direction.

The second pressing member 62, which is coupled to the +A-end of the shaft member 72, may be a lever member that extends from the shaft member 72 in a direction intersecting both the −X and −B directions. The second pressing member 62 includes a coupled section 63, an arm section 64, a curved section 65, and an insertion section (described later). Since the arm section 64 and the curved section 65 have substantially the same configurations, respectively, as the arm section 44 and the curved section 45, details of the arm section 64 and the curved section 65 will not be described. The curved section 65 comes into contact with a corresponding portion of the outer circumferential surface of the shaft section 21A (see FIG. 5) from the −B direction. The coupled section 63 has a through-hole (not illustrated) formed across the coupled section 63 in the +A direction. Into this through-hole, the +A-end of the shaft member 72 is press-fitted. The second pressing member 62 thus rotates together with the shaft member 72 at substantially the same timing.

The spring member 76 presses the first pressing member 42 in the −B direction, whereas the spring member 77 presses the second pressing member 62 in the −B direction. Since both the spring member 76 and the spring member 77 are formed so as to be symmetric to one another in the +A direction, only the details of the spring member 76 will be described below, and the details of the spring member 77 will not be described accordingly.

The spring member 76, which may be a torsion spring, includes: a coil section 76A through the shaft member 72 is inserted; a first extension 76B that is mounted on a corresponding portion of the arm section 44; and a second extension 76C that is placed on a corresponding portion of the main body 2 (see FIG. 1). When the −X-end of the first pressing member 42 rotates in the +B direction by being lifted, a pressing force, or a reactive force, of the spring member 76 is applied to the first pressing member 42 in the −B direction.

The shaft member 72, which may be a rod-shaped member extending in the +A direction, is rotatably provided in the second unit 4 (see FIG. 1). The +A-end of the shaft member 72 is press-fitted into a through-hole (not illustrated) in the second pressing member 62 so that the shaft member 72 is fixed to the second pressing member 62. The −A-end portion of the shaft member 72 may be machined so that a first contact surface 73A and a second contact surface 73C are formed thereon so as to expand in a direction orthogonal to a diameter direction of the shaft member 72. As a result, the first contact surface 73A, a curved surface 73B, the second contact surface 73C, and a curved surface 73D are present on the −A-end portion of the shaft member 72 as viewed from the −A-side. Both of the first contact surface 73A and the second contact surface 73C are arranged substantially parallel to one another. In this case, as the shaft member 72 is viewed from the +A-side (see FIG. 7), an intersection A is formed between the first contact surface 73A and the curved surface 73D; an intersection B is formed between the first contact surface 73A and the curved surface 73B, an intersection C is formed between the curved surface 73B and the second contact surface 73C; and an intersection D is formed between the second contact surface 73C and the curved surface 73D. Furthermore, the −A-end of the shaft member 72 is inserted into the insertion section 46 in the −A direction.

The direction in which the first pressing member 42 rotates so as to move away from the shaft section 17A in the +B direction (see FIG. 5) and in which the second pressing member 62 rotates so as to move away from the shaft section 21A in the +B direction (see FIG. 5) is denoted by +R. The direction in which the first pressing member 42 rotates so as to move toward the shaft section 17A in the −B direction and in which the second pressing member 62 rotates so as to move toward the shaft section 21A in the −B direction is denoted by −R.

Figure 7:
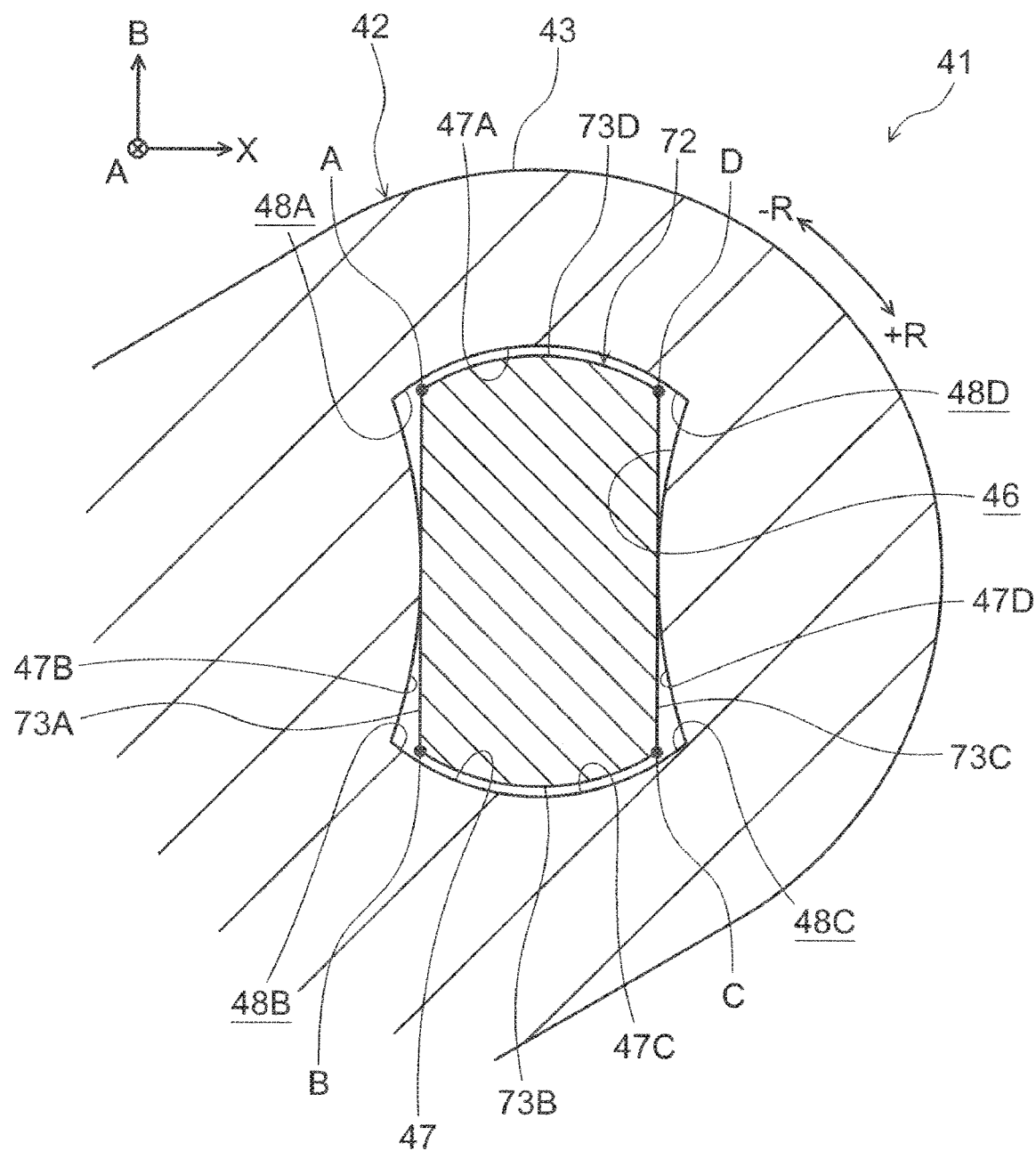
FIG. 7 is a cross-sectional view of gaps formed in the first pressing section.

As illustrated in FIG. 7, the insertion section 46 may be a through-hole formed across the coupled section 43 in the +A direction. The insertion section 46 has an inner circumferential surface 47, which includes an inner surface 47A and an inner surface 47C depressed in a diameter direction of the coupled section 43; and a first curved surface 47B and a second curved surface 47D bulging in the direction opposite to the diameter direction, as viewed from the −A-side. The first curved surface 47B and the second curved surface 47D face one another in the +X direction. The curvature of the first curved surface 47B is substantially the same as the curvature of the second curved surface 47D.

The state where the first pressing member 42 does not rotate relative to the shaft member 72 is referred to below as the indifferent state. When the first pressing member 42 is in the indifferent state, the bulging portion of the first curved surface 47B is in contact with the center of the first contact surface 73A in the +B direction, and the bulging portion of the second curved surface 47D is in contact with the center of the second contact surface 73C in the +B direction. In addition, when the first pressing member 42 is in the indifferent state, four gaps, or gaps 48A, 48B, 48C, and 48D, are provided between the first pressing member 42 and the shaft member 72 as viewed from the −A-side. The gaps 48A, 48B, 48C, and 48D are arranged in this order in the −R direction.

When the first pressing member 42 starts rotating in the +R direction, the areas of the gaps 48A and 48C decrease but the areas of the gaps 48B and 48D increase. Then, when the first curved surface 47B comes into contact with the portion of the shaft member 72 near the intersection A and the second curved surface 47D comes into contact with the portion of the shaft member 72 near the intersection C, the shaft member 72 starts rotating together with the first pressing member 42 in the +R direction.

When the first pressing member 42 starts rotating in the −R direction, the areas of the gaps 48A and 48C increase but the areas of the gaps 48B and 48D decrease. Then, when the first curved surface 47B comes into contact with near the intersection B and the second curved surface 47D comes into contact with the portion of the shaft member 72 near the intersection D, the shaft member 72 starts rotating together with the first pressing member 42 in the −R direction.

As described above, the timing when the shaft member 72 and the first pressing member 42 start rotating together with one another in the +R direction comes after the timing when the first pressing member 42 rotates alone in the +R direction. Likewise, the timing when the shaft member 72 and the first pressing member 42 start rotating together with one another in the −R direction comes after the timing when the first pressing member 42 rotates alone in the −R direction. It should be noted that the second pressing member 62 (see FIG. 5) always rotate together with the shaft member 72. In this case, each of the gaps 48A, 48B, 48C, and 48D acts as a clearance by which the start timing of the first operation performed by the first pressing member 42 is shifted from the start timing of the second operation performed by the second pressing member 62.

Figure 8:
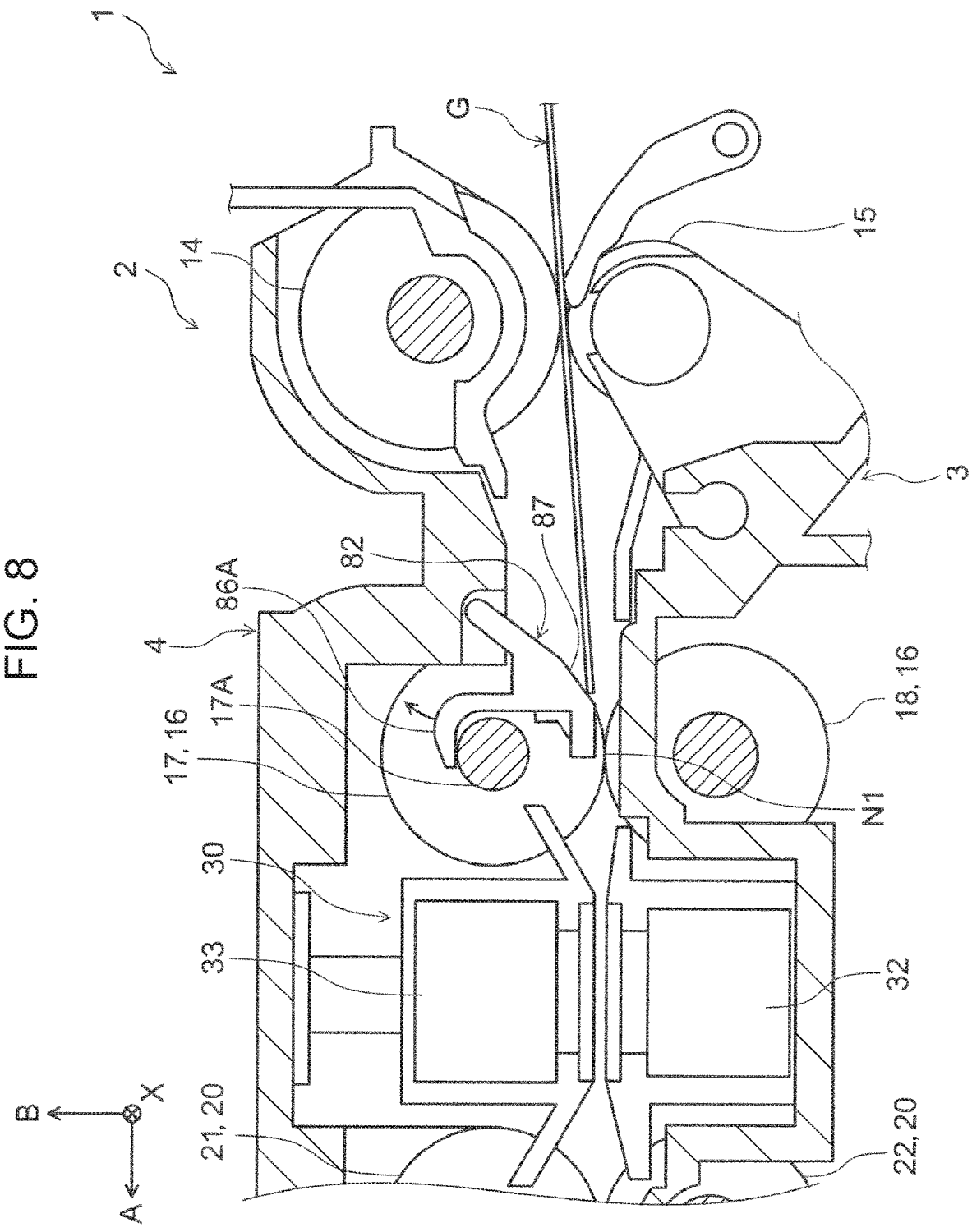
FIG. 8 is a partial, cross-sectional view of the scanner in which a thin material is fed from the nip between the feed roller and the separation roller toward the first transport roller pair.

As illustrated in FIG. 8, a correcting member 82 is provided between the feed roller 14 and the first transport roller pair 16 in the main body 2. The correcting member 82 is disposed so as to come into contact with a center, in the +X direction intersecting the +A direction, of the material G being fed by the feed roller 14. The correcting member 82 is provided in the second unit 4 so as to be pivotable toward the shaft section 17A of the first roller 17. The correcting member 82 corrects warping, in the +B direction, of the center of the material G in the +X direction and guides the material G to the first nip N1.

Figure 9:
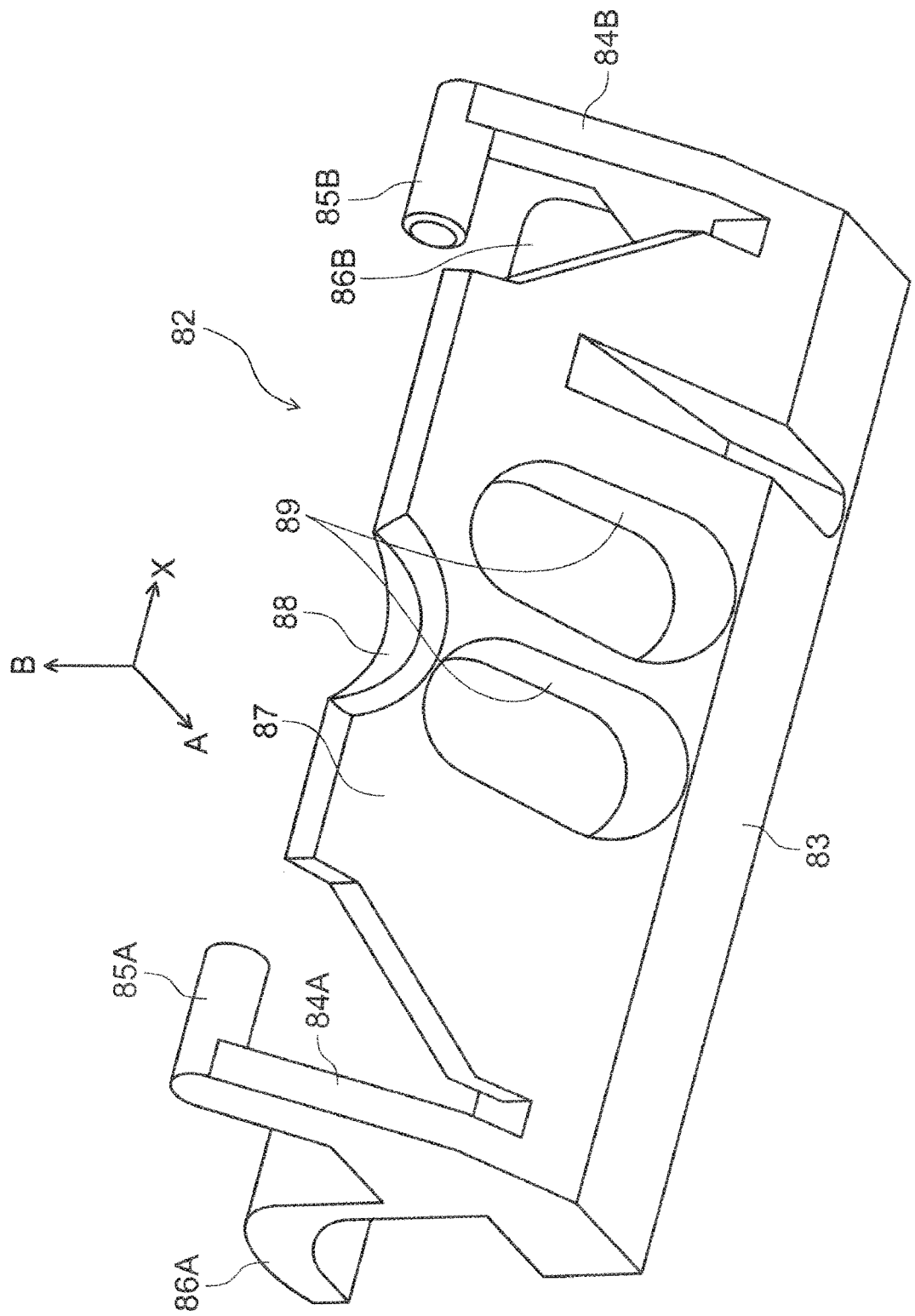
FIG. 9 is a perspective view of the correcting member.

As illustrated in FIG. 9, the correcting member 82 may be a single member that includes a bottom section 83, pairs of arm sections 84A and 84B, shaft sections 85A and 85B, and angled sections 86A and 86B, and a slope section 87. A description will be given below of the function of the correcting member 82 when the bottom section 83 is positioned in the +A direction.

The bottom section 83, which has a sheet shape having a predetermined thickness in the +B direction, extends in the +X direction. The arm section 84A is provided on the −X-side of the bottom section 83 and extends in both the −A and +B directions from the bottom section 83. Likewise, the arm section 84B is provided on the +X-side of the bottom section 83 and extends in both the −A and +B directions from the bottom section 83. The shaft section 85A may be a rod-shaped component extending in the +X direction from the arm section 84A, whereas the shaft section 85B may be a rod-shaped component extending in the −X direction from the arm section 84A. Each of the shaft section 85A and the shaft section 85B is rotatably supported in the second unit 4 (see FIG. 8).

The angled section 86A is provided on the −X-side of the bottom section 83 and on the +A-side of the arm section 84A. The angled section 86A is curved at a substantially right angle in the +A direction as viewed from the −X-side. Likewise, the angled section 86B is provided on the +X-side of the bottom section 83 and on the +A-side of the arm section 84B. The angled section 86B is curved at a substantially right angle in the +A direction as viewed from the +X-side.

The slope section 87 may be a sheet-shaped component that is provided between the arm sections 84A and 84B and extends from the bottom section 83 in both the −A and +B directions. In addition, the slope section 87 may incline in the +B direction. The slope section 87 is disposed so as to be able to come into contact with the center, in the +X direction, of the downstream edge of the material G being transported. The distal side of the slope section 87 is shorter than the proximal end of the slope section 87 in the +X direction. A depression section 88 is formed on the distal side of the slope section 87. Furthermore, two through-holes 89 are formed across the slope section 87 at substantially the center of the slope section 87 in the +X direction. The slope section 87 is pressed against the material G by a spring (not illustrated).

Next, a function and effect of the scanner 1 described above will be described below. When the components of the scanner 1 are explained, their reference numerals in FIGS. 1 to 9 will be cited; however, it should be noted that those reference numerals will be skipped as appropriate.

As illustrated in FIG. 8, the slope section 87 is positioned upstream of the first nip N1 in the +A direction, with the angled section 86A being in partial contact with the shaft section 17A. Hereinafter, a description will be given regarding a case where the feed roller 14 feeds a relatively thin material G to the first transport roller pair 16.

The feed roller 14, first, feeds the downstream edge of the material G in the +A direction to the first roller 17 positioned on the +B-side of the first nip N1. Since the feed roller 14 is positioned at the center in the +X direction, the center of the material G in the +X direction may be warped in the +B direction. If the center of the material G in the +X direction may be warped in the +B direction, the slope section 87 comes into contact with this warped portion. As a result, the correcting member 82 receives a rotational force from the material G through the slope section 87, so that the angled section 86A comes off and moves away from the shaft section 17A.

Figure 10:
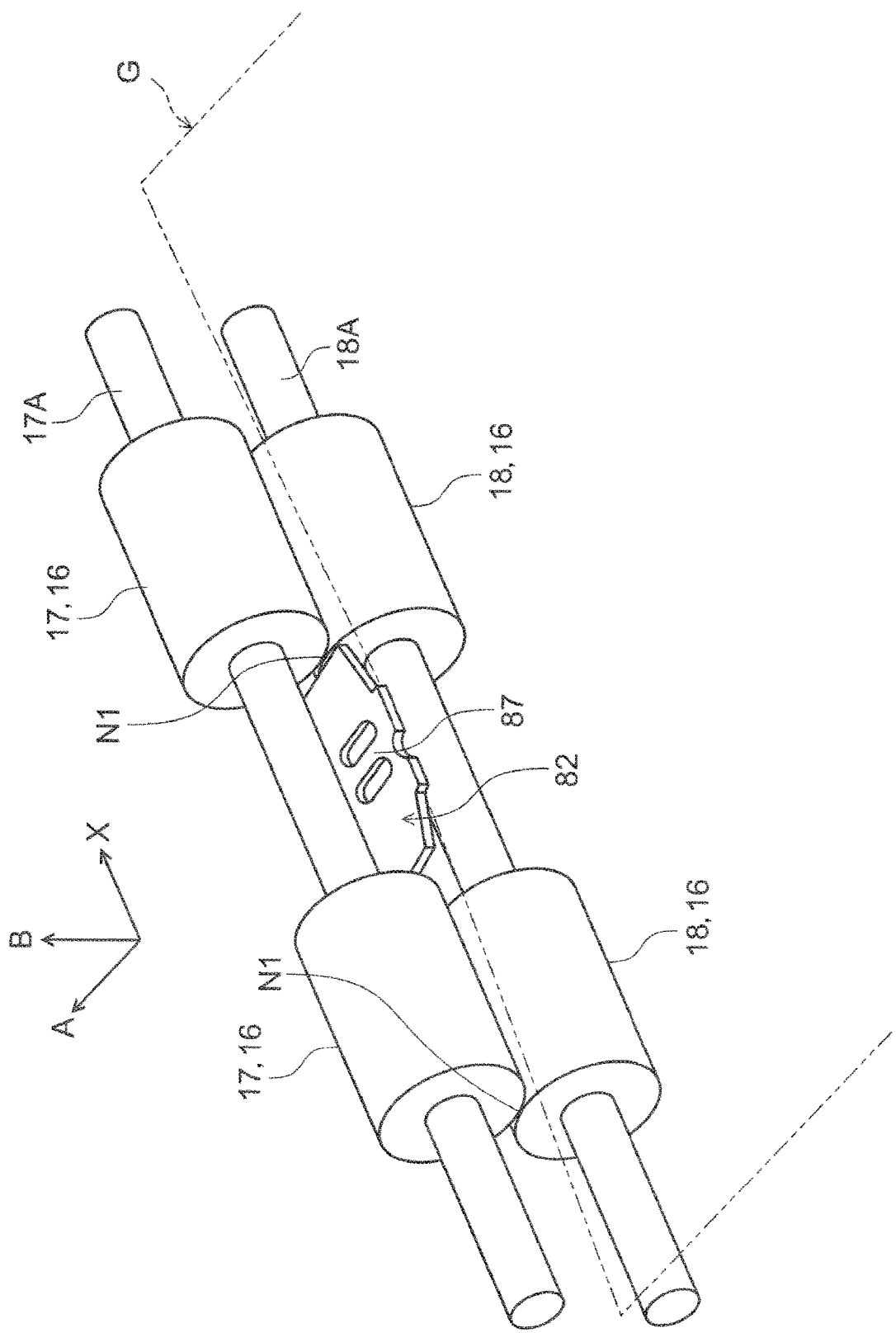
FIG. 10 is a perspective view of a configuration in which the correcting member corrects the posture of the downstream edge of the material before the material reaches the first transport roller pair.

As illustrated in FIG. 10, when coming into contact with the center of the material G in the +X direction, the slope section 87 applies a reactive force to the center. This reactive force contains a pressing force of a spring (not illustrated) and suppresses the center of the material G in the +X direction from being warped in the +B direction. The feed roller 14 then further feeds the material G in the +A direction while the slope section 87 keeps in contact with the material G, namely, while the correcting member 82 is guiding the material G to the first nip N1. After that, the first transport roller pair 16 transports the material G in the +A direction. It should be noted that FIG. 10 schematically illustrates only the slope section 87 of the correcting member 82 and does not illustrate other components. The transport of the material G after it has passed through the first nip N1 will be skipped.

Figure 11:
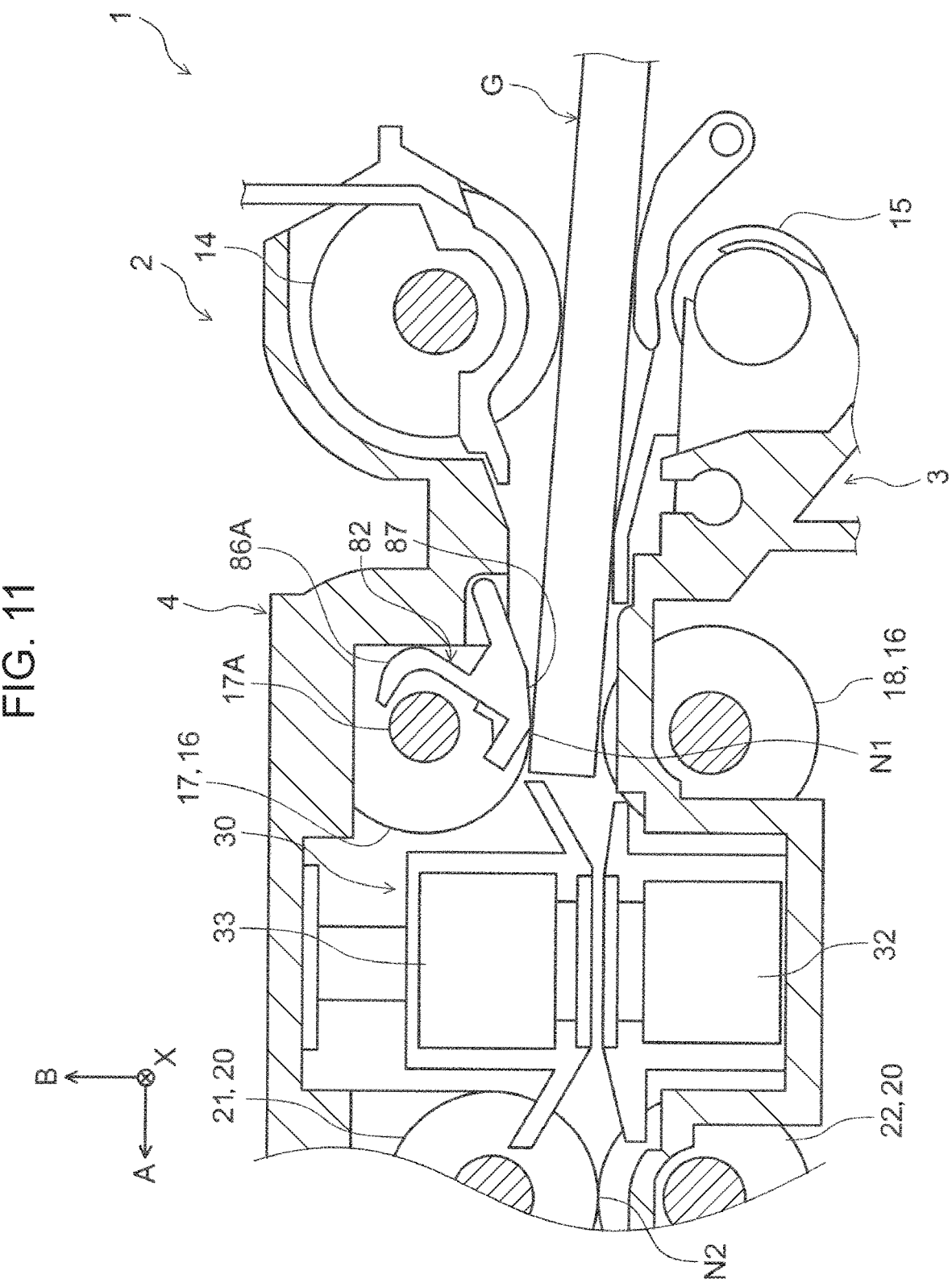
FIG. 11 is a partial, cross-sectional view of the scanner in which a thick material is fed from the nip between the feed roller and the separation roller toward the first transport roller pair.

Next, with reference to FIG. 11, a description will be given below regarding a case where the feed roller 14 feeds a relatively thick material G such as a booklet and the first transport roller pair 16 then transports it. After having corrected the warping of the downstream edge of the material G in the +A direction, the correcting member 82 guides the downstream edge to the first nip N1. The first transport roller pair 16 then transports the material G to a read site opposite the reader 30 by virtue of its rotational force. After the reader 30 has read the material G, the first transport roller pair 16 further transports the material G to the second nip N2.

Figure 12:
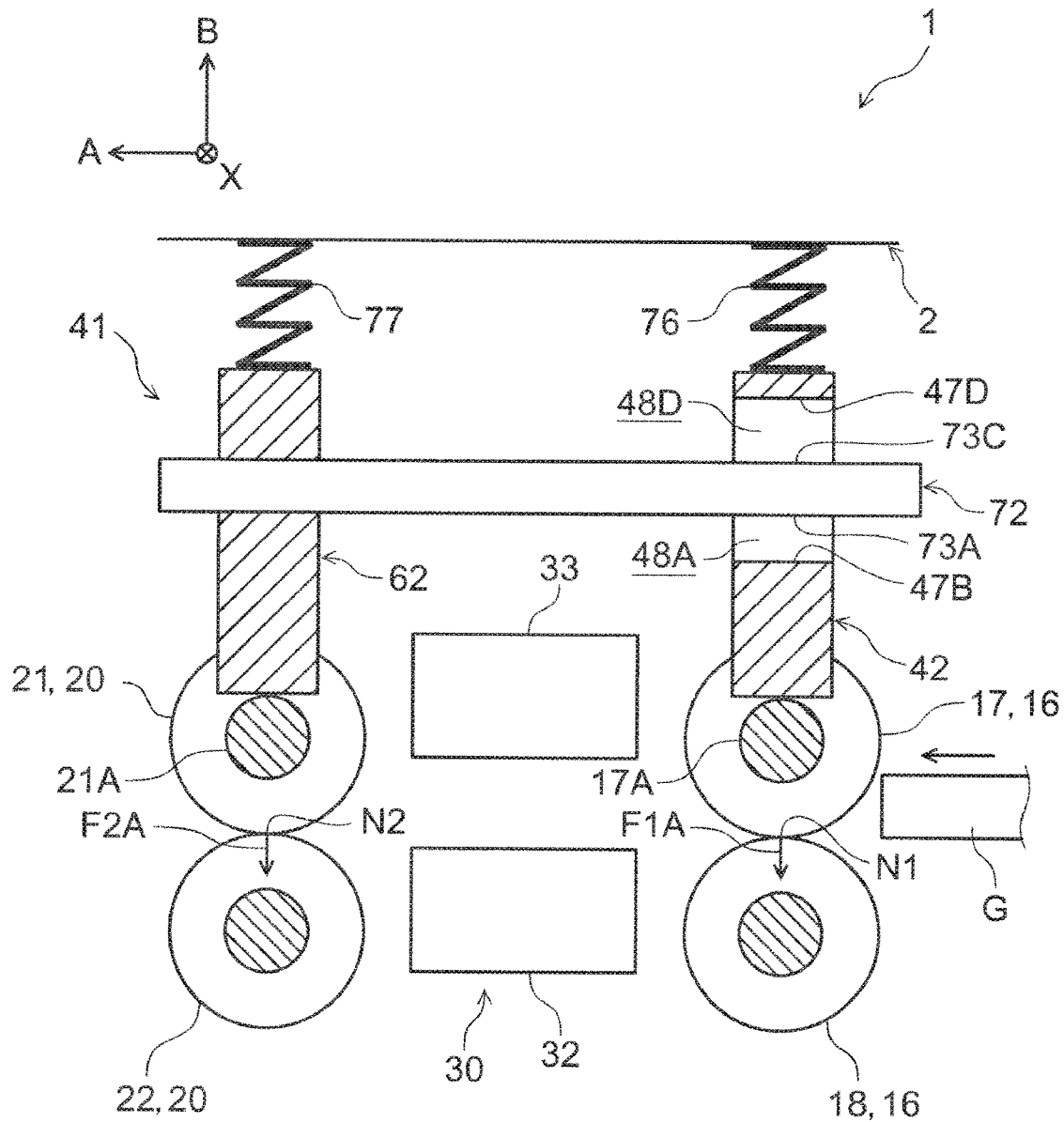
FIG. 12 is a partial, cross-sectional view of the scanner in which a material has not yet entered the first nip or the second nip.

With reference to FIGS. 12 to 15 that schematically illustrate individual members, a behavior of the pressing section 41 (see FIG. 5) will be described below. As illustrated in FIG. 12, before a timing when a material G enters the first nip N1 comes, the first curved surface 47B is disposed apart from the first contact surface 73A with the gap 48A therebetween, and the second curved surface 47D is also apart from the second contact surface 73C with the gap 48D therebetween. In this state, the first pressing member 42 presses the shaft section 17A in the −B direction, whereas the second pressing member 62 presses the shaft section 21A in the −B direction. Before the timing when the material G enters the first nip N1 comes, the first pressing force F1A is generated between the first roller 17 and the second roller 18, whereas the second pressing force F2A is generated between the third roller 21 and the fourth roller 22. In this embodiment, the second pressing force F2A may be equal to the first pressing force F1A. The timing when the material G enters the first nip N1 is defined as a first timing t1 (not illustrated).

Figure 13:
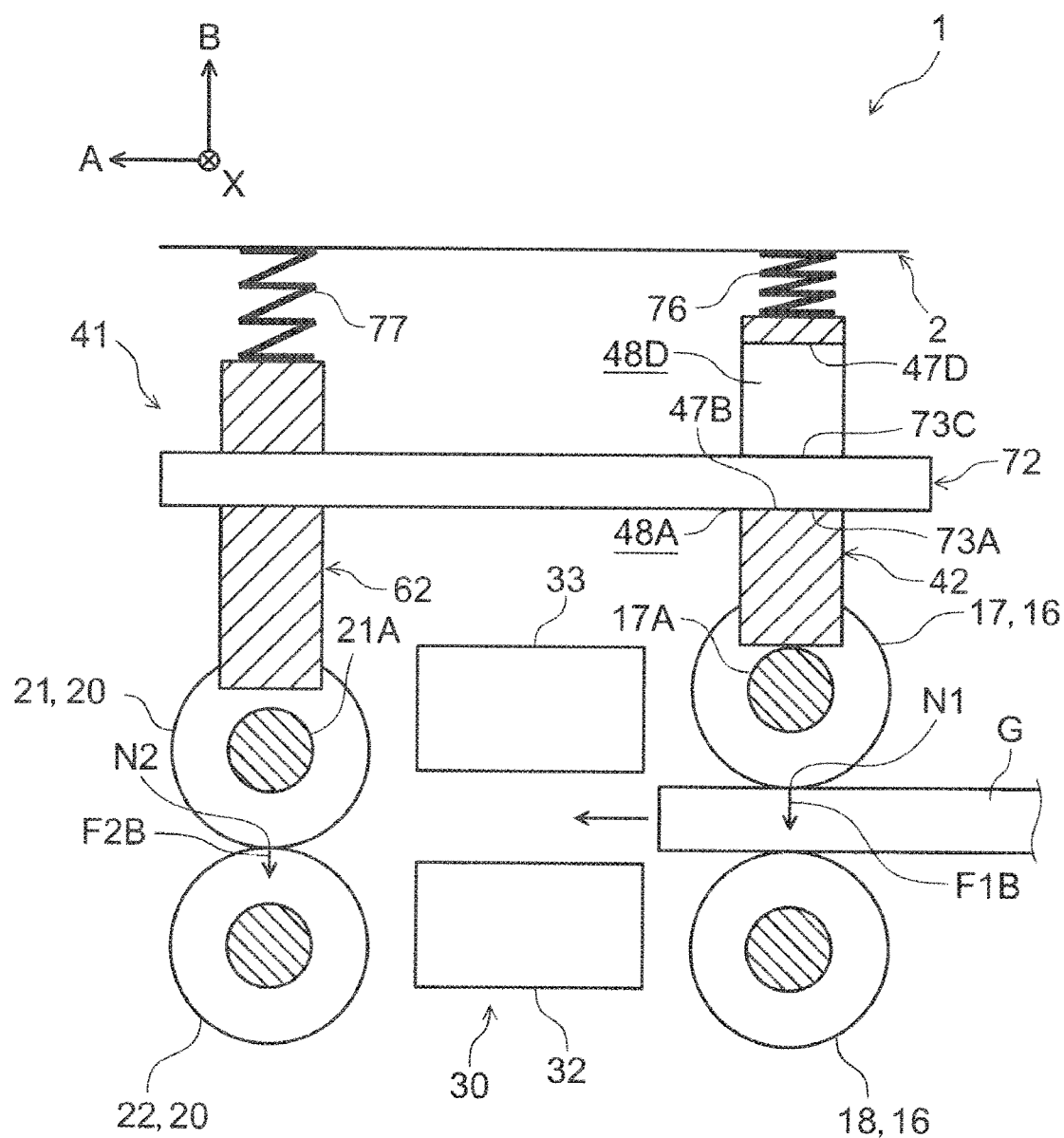
FIG. 13 is a partial, cross-sectional view of the scanner in which the material has already entered the first nip but has not yet entered the second nip.

As illustrated in FIG. 13, when entering the first nip N1, the material G causes the first roller 17 to move in the +B direction, thereby making the first pressing force F1B become greater than the first pressing force F1A (see FIG. 12). In response, the shaft section 17A rotates the first pressing member 42 in the +R direction (see FIG. 7), which decreases the area of the gap 48A and brings the first contact surface 73A into contact with the first curved surface 47B. Then, the rotational force of the first pressing member 42 is transmitted to the second pressing member 62 via the shaft member 72, thereby rotating the second pressing member 62 in the +R direction. As a result, the second pressing member 62 moves away from the shaft section 21A in the +B direction. This timing is defined as a second timing t2 (not illustrated). At the second timing t2, the second pressing force F2B becomes lower than the second pressing force F2A (see FIG. 12). In addition, the second pressing force F2B also becomes lower than the first pressing force F1A.

As illustrated in FIG. 14, when the downstream edge of the material G in the +A direction enters the second nip N2 while a portion of the material G is present in the first nip N1, the material G causes the third roller 21 to move in the +B direction. In response, the shaft section 21A comes into contact with the second pressing member 62, thereby further rotating the second pressing member 62 in the +R direction (see FIG. 7). This timing is defined as a third timing t3 (not illustrated). At the third timing t3, the first contact surface 73A is disposed apart from the first curved surface 47B. In this way, the second pressing force F2C becomes greater than the second pressing force F2B (see FIG. 13), while the first pressing force F1C becomes lower than the first pressing force F1B (see FIG. 13). In this case, the second pressing force F2C becomes equal to the first pressing force F1C.

Figure 15:
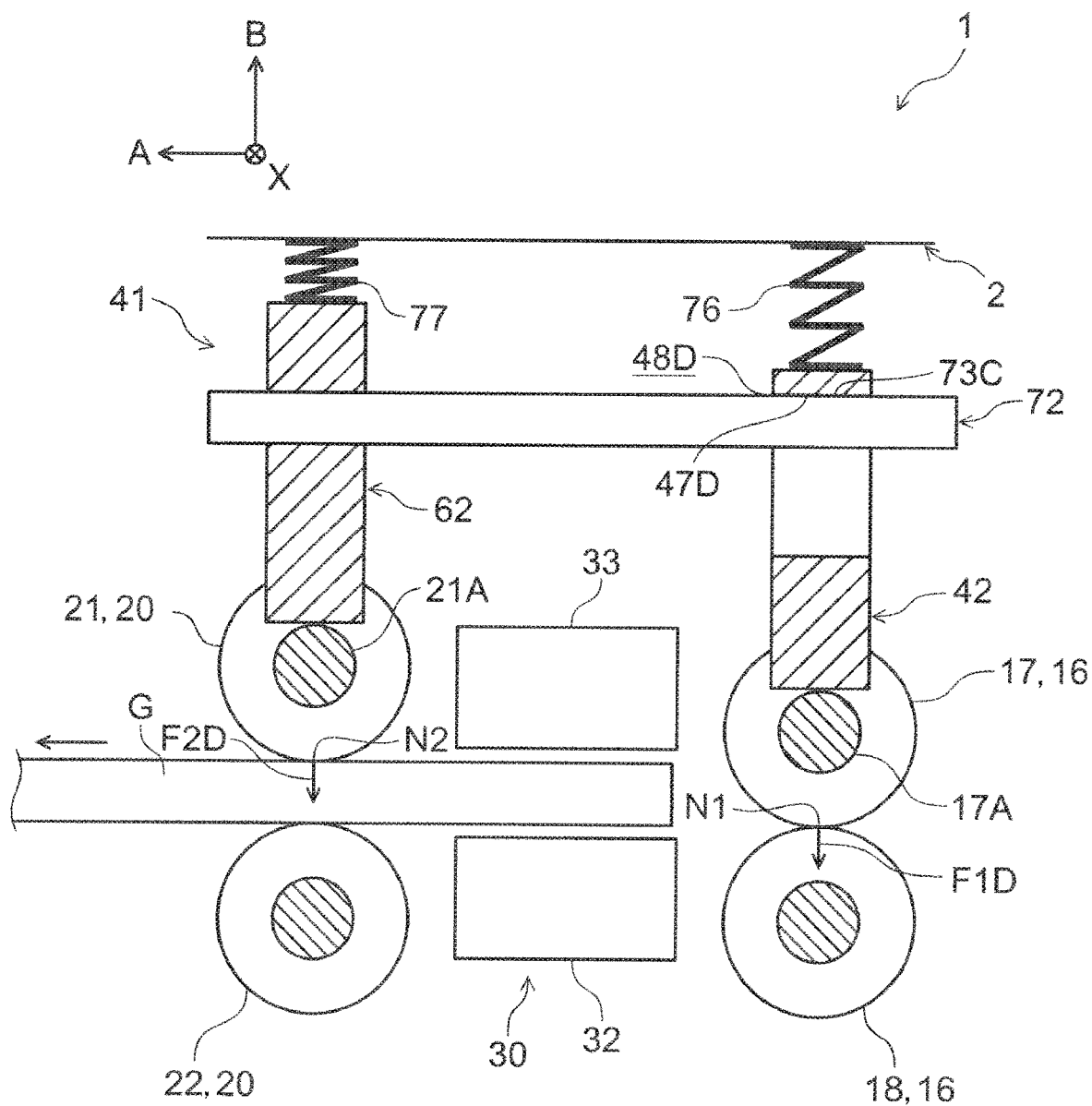
FIG. 15 is a partial, cross-sectional view of the scanner in which the material has already left the first nip and has already entered the second nip.

As illustrated in FIG. 15, when the material G that has passed through the first nip N1 is present in the second nip N2, the first roller 17 moves in the −B direction, thereby rotating the first pressing member 42 in the −R direction (see FIG. 7). In response, the area of the gap 48D decreases, and the second contact surface 73C comes into contact with the second curved surface 47D. This timing is defined as a fourth timing t4 (not illustrated). At the fourth timing t4, the second pressing force F2D becomes greater than the second pressing force F2C (see FIG. 14), while the first pressing force F1D becomes lower than the first pressing force F1C (see FIG. 14). After the material G has left the second nip N2, both the first pressing member 42 and the second pressing member 62 enter a state that is the same as at the first timing t1. More specifically, the first pressing force F1 becomes equal to the first pressing force F1A, while the second pressing force F2 becomes equal to the second pressing force F2A.

According to a scanner 1, as described above, when a reader 30 reads a thick material G such as a booklet, the material G is first transported in a +A direction by a first transport roller pair 16 and passes through a first nip N1 between a first roller 17 and a second roller 18 while receiving a first pressing force F1B from the first roller 17 and the second roller 18. Then, the material G reaches the site opposite the reader 30 and is read by the reader 30, after which the material G is transported to a second transport roller pair 20. In this case, a pressing section 41 varies a second pressing force in such a way that the second pressing force F2B when the first transport roller pair 16 transports the material G but the second transport roller pair 20 does not transport the material G becomes lower than the second pressing force F2A when neither the first transport roller pair 16 nor the second transport roller pair 20 transports the material G. When the downstream edge of the read material G in the +A direction enters a second nip N2 between a third roller 21 and a fourth roller 22, the third roller 21 and the fourth roller 22 are moved away from one another by the material G. In this case, by setting the second pressing force F2B to lower than the second pressing force F2A, a load placed on the first transport roller pair 16 is lightened. As a result, the first transport roller pair 16 can keep transporting the material G at a constant speed. This configuration thus suppresses the speed at which the first transport roller pair 16 transports the material G from being decreased, thereby successfully reducing the risk of a lowered quality in which the reader 30 reads the material G.

If both the third roller 21 and the fourth roller 22 are driven by the transport motor 50, the downstream edge of the material G may receive a great resistance from the third roller 21 when coming into contact with the circumferential surface of the third roller 21. This disadvantage tends to be prominent, especially when the third roller 21 rotates at a lower speed than a target one. This configuration, however, sets the second pressing force F2B to less than the second pressing force F2A as described above, thereby successfully reducing a load placed on the first transport roller pair 16 upon the entry of the downstream edge of the material G in the second transport roller pair 20.

According to a scanner 1, an increased pressing force is applied to the material G when only one of a first transport roller pair 16 and a second transport roller pair 20 transports a material G. This configuration suppresses the material G from slipping on the first transport roller pair 16 or the second transport roller pair 20, thereby successfully transporting the material G stably.

According to a scanner 1, a first operation performed by a first pressing member 42 and a second operation performed by a second pressing member 62 is interlocked to vary a first pressing force and a second pressing force. This configuration can be implemented in a simple manner, as opposed to a configuration in which the mechanisms for varying the first pressing force and the second pressing force are driven independently of one another.

Consider a comparative example in which a first pressing member 42 is integrated with a second pressing member 62. When the first pressing member 42 is somewhat displaced, the second pressing member 62 may also be displaced substantially simultaneously. Likewise, when the second pressing member 62 is somewhat displaced, the first pressing member 42 may also be displaced substantially simultaneously. In shirt, the configuration in which the first pressing member 42 is integrated with the second pressing member 62 is prone to fluctuate the pressing forces of the first pressing member 42 and the second pressing member 62. In a scanner 1 according to one embodiment, however, forming gaps 48A, 48B, 48C, and 48D allows the start timings of the first operation and the second operation to be shifted from one another, although the first operation and the second operation are interlocked together. As a result, even when one of the first pressing member 42 and the second pressing member 62 is somewhat displaced, the other is not largely displaced simultaneously. This configuration thus successfully suppresses the first pressing force and the second pressing force from fluctuating.

According to a scanner 1, the pressed portions of a shaft section 17A and a shaft section 21A are aligned with the center in a +X direction. This configuration thus enables a load to be placed evenly on each of the shaft section 17A and the shaft section 21A in the +X direction.

According to a scanner 1, a correcting member 82 comes into contact with the center of a material G in an +X direction, thereby suppressing the center of the material G in the +X direction from floating off a transport route R. This configuration thus successfully suppresses a failure to feed the material G to a first transport roller pair 16 due to wrinkling or jamming of the material G.

According to a scanner 1, when coming into contact with a material G being transported, a correcting member 82 guides the material G to a first nip N1 between a first roller 17 and a second roller 18. This configuration thus reliably transports the material G to the first nip N1 between the first roller 17 and the second roller 18, as opposed to a configuration without such a correcting member 82.

According to a scanner 1, when a thin material G is fed to a first transport roller pair 16, a correcting member 82 comes into contact with the material G, thereby successfully suppressing the material G from partly floating off a transport route R. In this case, the correcting member 82 does not largely pivot because only a small reactive force is applied by the material G to the correcting member 82. When a thick material G is transported to a first transport roller pair 16, a great reactive force is applied by the material G to the correcting member 82. As a result, the correcting member 82 largely pivots toward a shaft section 17A, namely, moves far away from a transport route R of a material G. This configuration thus suppresses an increase in the reactive force applied by the correcting member 82 to a material G being transported, thereby successfully reducing the load placed on a feed roller 14 during feeding of a thick material G.

A scanner 1 according to one embodiment of the present disclosure basically has a configuration as described above; however, it is obvious that the scanner 1 may undergo partial modifications, omissions, replacements, and combinations without departing from the spirit of the present disclosure in this application. As described above, the scanner 1 switches the posture of a main body 2 relative to a stand 6 by virtue of the power from a posture switching motor 40; however, the scanner 1 may switch it in addition to or instead of a user's manual operation.

According to a scanner 1, a pressing section 41 does not necessarily have to vary a first pressing force F1 in such a way that a first pressing force F1B when a first transport roller pair 16 transports a material G but a second transport roller pair 20 does not transport the material G becomes greater than a first pressing force F1C when both the first transport roller pair 16 and the second transport roller pair 20 transport the material G. Alternatively, the pressing section 41 may vary both the first pressing force F1B and the first pressing force F1C so as to be equal to one another. Moreover, the pressing section 41 does not necessarily have to vary a second pressing force F2 in such a way that a second pressing force F2D when the second transport roller pair 20 transports a material G but the first transport roller pair 16 does not transport the material G becomes greater than a second pressing force F2C when both the first transport roller pair 16 and the second transport roller pair 20 transport the material G. Alternatively, the pressing section 41 may vary both the second pressing force F2D and the second pressing force F2C so as to be equal to one another.

The pressing section 41 does not necessarily have to vary the first pressing force F1C and the second pressing force F2C so as to be equal to one another when both the first transport roller pair 16 and the second transport roller pair 20 transports the material G. Alternatively, the pressing section 41 may vary the first pressing force F1C and the second pressing force F2C so as to be different from one another when both the first transport roller pair 16 and the second transport roller pair 20 transport the material G. Likewise, the pressing section 41 may vary the first pressing force F1A and a second pressing force F2A so as to be different from one another when neither the first transport roller pair 16 nor the second transport roller pair 20 transports the material G.

According to a scanner 1, a pressing section 41 does not necessarily have to include a shaft member 72. In this case, the pressing section 41 does not have to interlock a first operation in which a first pressing member 42 varies a first pressing force F1 and a second operation in which a second pressing member 62 varies a second pressing force F2.

According to a scanner 1, each of gaps 48A, 48B, 48C, and 48D may have any given size. More specifically, the size of the gaps 48B and 48D may be larger than the size of the gaps 48A and 48C. In this case, when a material G that has left a first nip N1 and enters a second nip N2, a pressing section 41 may apply a predetermined first pressing force to a first transport roller pair 16.

If the scanner 1 transports a booklet, the pressing section 41 may apply the fixed first pressing force to the upstream edge of this booklet when the downstream edge of the booklet that has passed through a first nip N1 enters a second nip N2. In some cases, a booklet, such as a passport, to be transported has different thicknesses at its longitudinal edges. If a scanner 1 transports a booklet having different thicknesses at the downstream and upstream edges in the +A direction, when the downstream edge of the booklet which has passed through a first nip N1 enters a second nip N2 and the upstream edge of the booklet enters the first nip N1, a first pressing force F1 applied by the first transport roller pair 16 to the upstream edge of the booklet may decrease. As a result, the first transport roller pair 16 might fail to nip the upstream edge of the booklet appropriately, thereby fluctuating a transport speed of the booklet during the reading of the booklet with a reader 30. In the scanner 1 according to this embodiment, however, even when a thicker downstream edge of the booklet which has passed through the first nip N1 enters the second nip N2 and a thinner upstream edge of the booklet enters the first nip N1, the first transport roller pair 16 presses the upstream edge of the booklet at the fixed first pressing force, thereby successfully suppressing the booklet from being transported at a fluctuating speed.

Gaps 48A, 48B, 48C, and 48D may be provided in a second pressing member 62, and a first pressing member 42 may be fixed to a shaft member 72. Alternatively, the first pressing member 42 may be separated portions, which press respective end portions of a shaft section 17A in its axial direction. Likewise, the second pressing member 62 may be separated portions, which press respective end portions of a shaft section 21A in its axial direction.

A scanner 1 does not necessarily have to include a correcting member 82 or may include a correcting member 82 that corrects warping of a material G but does not guide the material G to a first nip N1. In addition, the correcting member 82 may be slidable in the ±B directions, instead of being pivotable.

What is claimed is:

1. An image reading apparatus comprising:
   a first transport roller pair that simultaneously presses and transports a material, the first transport roller pair having a first roller and a second roller;
   a reader that reads the material being transported by the first transport roller pair;
   a second transport roller pair that simultaneously presses and transports the material, the second transport roller pair having a third roller and a fourth roller, the second transport roller pair being positioned downstream of the reader in a transport direction of the material;
   a driver that applies power to the first roller, the second roller, the third roller, and the fourth roller; and
   a pressing section configured to vary a first pressing force and a second pressing force, the first pressing force being generated between the first roller and the second roller, the second pressing force being generated between the third roller and the fourth roller, wherein
   the pressing section varies the second pressing force in such a way that the second pressing force when the first transport roller pair transports the material but the second transport roller pair does not transport the material becomes lower than the second pressing force when neither the first transport roller pair nor the second transport roller pair transports the material.

2. The image reading apparatus according to claim 1, wherein
   the pressing section varies the first pressing force in such a way that the first pressing force when the first transport roller pair transports the material but the second transport roller pair does not transport the material becomes greater than the first pressing force when both the first transport roller pair and the second transport roller pair transport the material, and the pressing section varies the second pressing force in such a way that the second pressing force when the second transport roller pair transports the material but the first transport roller pair does not transport the material becomes greater than the second pressing force when both the first transport roller pair and the second transport roller pair transport the material.

3. The image reading apparatus according to claim 1, wherein
   the pressing section varies the first pressing force and the second pressing force so as to become equal to one another when both the first transport roller pair and the second transport roller pair transport the material.

4. The image reading apparatus according to claim 1, wherein
   the pressing section includes
      a first pressing section configured to vary the first pressing force by varying a force applied to a first rotation axis of the first roller,
      a second pressing section configured to vary the second pressing force by varying a force applied to a second rotation axis of the third roller, and
      an interlocking section that interlocks a first operation in which the first pressing section varies the first pressing force and a second operation in which the second pressing section varies the second pressing force.

5. The image reading apparatus according to claim 4, wherein
   the interlocking section is a shaft member rotatably provided,
   one of the first pressing section and the second pressing section is fixed to the shaft member, and
   a gap by which a timing at which the first operation starts is shifted from a timing at which the second operation starts is provided between the shaft member and the other of the first pressing section and the second pressing section.

6. The image reading apparatus according to claim 4, wherein
   the first pressing section presses a center of the first rotation axis in an axial direction of the first rotation axis, and
   the second pressing section presses a center of the second rotation axis in the axial direction.

7. The image reading apparatus according to claim 1, further comprising:
   a feed roller that feeds the material to the first transport roller pair, the feed roller being provided upstream of the first transport roller pair in the transport direction; and
   a correcting member that comes into contact with the material, the correcting member being provided between the feed roller and the first transport roller pair, wherein the correcting member comes into contact with a center of the material being fed by the feed roller in a width direction of the material, the width direction intersecting the transport direction.

8. The image reading apparatus according to claim 7, wherein
   the correcting member guides the material to a nip between the first roller and the second roller.

9. The image reading apparatus according to claim 7, wherein
   the correcting member is provided pivotably toward a first rotation axis of the first roller.

10. An image reading apparatus comprising:
- a first transport roller pair that simultaneously presses and transports a material, the first transport roller pair having a first roller and a second roller;
- a second transport roller pair that simultaneously presses and transports the material, the second transport roller pair having a third roller and a fourth roller, the second transport roller pair being positioned downstream of the first transport roller pair in a transport direction of the material;
- a reader that is configured to read the material being transported by the first transport roller pair and the second transport roller pair;
- a driver that applies power to the first roller, the second roller, the third roller, and the fourth roller; and
- a pressing section configured to vary a pressing force which is generated between the third roller and the fourth roller, wherein
- the pressing section varies the pressing force in such a way that the pressing force when the first transport roller pair transports the material but the second transport roller pair does not transport the material becomes lower than the pressing force when neither the first transport roller pair nor the second transport roller pair transports the material.

11. The image reading apparatus according to claim 10, wherein
- the pressing section is configured to vary a first pressing force which is generated between the first roller and the second roller.

* * * * *